United States Patent [19]
Bond et al.

[11] Patent Number: 5,499,399
[45] Date of Patent: Mar. 12, 1996

[54] TWO-DIMENSIONAL KERNEL ADAPTIVE INTERFERENCE SUPPRESSION SYSTEM

[75] Inventors: James W. Bond; David J. Marchette, both of San Diego, Calif.; Carey E. Priebe, King George, Va.; Thomas W. Schlosser, San Diego, Calif.

[73] Assignee: The United States of America as represented by the Secretary of the Navy, Washington, D.C.

[21] Appl. No.: 707,354

[22] Filed: May 29, 1991

[51] Int. Cl.$^6$ ............................................. H04B 15/00
[52] U.S. Cl. ............................ 455/296; 455/306; 455/309
[58] Field of Search ............................ 364/574; 455/296, 455/305, 309

[56] References Cited

PUBLICATIONS

Technical Report 1307, Aug. 1989, "Adaptive Locally Optimum Detection Based upon Kernel Estimation," Bond et al.

Primary Examiner—Salvatore Cangialosi
Attorney, Agent, or Firm—Harvey Fendelman; Thomas Glenn Keough; Peter A. Lipovsky

[57] ABSTRACT

A two-dimensional interference suppression system utilizes adaptive locally optimum detection algorithms derived from kernel estimation. By using these algorithms in the process of the invention, fewer receive samples are required to obtain useful estimates of probability density functions. The new adaptive locally optimum detection algorithms lend themselves to use with simple processors permitting applications involving very high sampling rates.

8 Claims, 22 Drawing Sheets

TWO-DIMENSIONAL KERNEL ADAPTIVE INTERFERENCE SUPPRESSION SYSTEM

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATION

This application is related to the patent application titled: "Kernel Adaptive Interference Suppression System" by inventors James W. Bond, David J. Marchette, Carey E. Priebe and Thomas W. Schlosser.

DOCUMENT INCORPORATED BY REFERENCE

The following document is incorporated by reference into this specification in its entirety: Silverman B. W., *Density Estimation for Statistics and Data Analysis*, 1986, Chapman and Hall, New York, N.Y.

BACKGROUND OF THE INVENTION

1. Field of the Invention

The invention relates generally to the suppression of interference amongst communication signals. More particularly, the invention relates to the implementation of statistical techniques to interference suppression.

2. Description of the Related Art

Radios may receive three forms of signals: noise, interference and communication. Noise, created in the atmosphere due to natural events such as lightning and the like, is largely unpredictable. Few steps are taken towards its elimination. Interference signals can be caused inadvertently, such as by several stations broadcasting on the same band, or can be caused deliberately, such as by an adversary transmitting signals to mask communication signals. A variety of techniques have been devised to combat interfering signals.

As major sources of radio interference are non-Gaussian in structure, a technique known to be effective in detecting communication signals in the presence of non-Gaussian interference has employed algorithms that estimate the statistics of the interference. This estimate has been used to transform received radios signals into perceptible communication signals.

One such estimation technique creates a probability density function (PDF) from discrete data. A transform is then created based upon the derivative of the natural log of the PDF corresponding to a magnitude, such as signal amplitude. Researchers have estimated PDFs of interfering signal amplitudes by creating histograms of received data. Finite difference operations were then used to estimate required derivatives.

The histogram technique has inherent inefficiencies that prevent its use with effective two-dimensional adaptive algorithms. This approach is known to be numerically unstable and, to be satisfactory, requires that a relatively great number of signal samples be taken. This high sample requirement makes the histogram method computationally demanding and confines its use mainly to dedicated microprocessors, and then primarily for those used with radios that operate in the lower portion of the radio frequency spectrum (low frequency [LF], very low frequency [VLF], extra low frequency [ELF]). For higher frequency ranges, sufficient sampling becomes extremely difficult.

In environments in which interference characteristics are radically and rapidly changing, the necessity to collect a large number of samples over time makes alternative approaches to the histogram technique worth pursuing.

In one such alternative, joint PDFs are estimated as a product of two one-dimensional PDFs but this approach could lead to a loss of performance for some types of interference.

There is thus a need for an interference suppression system that can be used with dedicated or non-dedicated microprocessors, that is suitable for use with radio receivers operating over both lower and upper portions of the radio frequency spectrum and that can provide interference suppression in radically and rapidly changing interference environments without the loss of system performance.

SUMMARY OF THE INVENTION

The invention meets these needs through a novel way of implementing interference suppression. The efficient statistical technique of kernel estimation is used to approximate PDFs and joint PDFs from a relatively few number of data samples. The invention uses this technique by viewing each received signal sample as defining a kernel function about the sample, with the PDF being an average of a finite number of these kernel functions.

The invention implements an Adaptive Locally Optimum Detection (ALOD) algorithm created especially for interference suppression. This algorithm implements kernel estimation to attempt to represent the joint probability density function of two random variables (magnitude and phase-difference) based upon a finite number of data points (signal samples). The algorithm provides an estimate of interference statistics so that received signal samples may be transformed into perceptible communication signals.

To separate interference from communication signals, the interference processor of the invention outputs the sum of a vector whose length is equal to a gain factor in the direction of a received signal vector and of a vector whose length is equal to a second gain factor in a direction that is perpendicular to the direction of the received signal vector. The main terms used to calculate the gain factors involve partial derivatives of the natural log of the joint PDF of the received signal magnitude and of its phase-difference.

OBJECTS OF THE INVENTION

It is an object of the invention to provide an improved interference suppression system.

Another object of the invention is to provide an interference suppression system that can be implemented through the use of dedicated or non-dedicated microprocessors.

A further object of the invention is to provide an improved interference suppression system that is operable in both the lower and upper portions of the frequency spectrum.

Yet a further object of the invention is to provide an interference suppression system that permits satisfactory results in radically and rapidly changing interference environments.

Other objects, advantages and new features of the invention will become apparent from the following detailed description of the invention when considered in conjunction with the accompanying drawings.

DESCRIPTION OF THE PREFERRED EMBODIMENT

Figure 1:
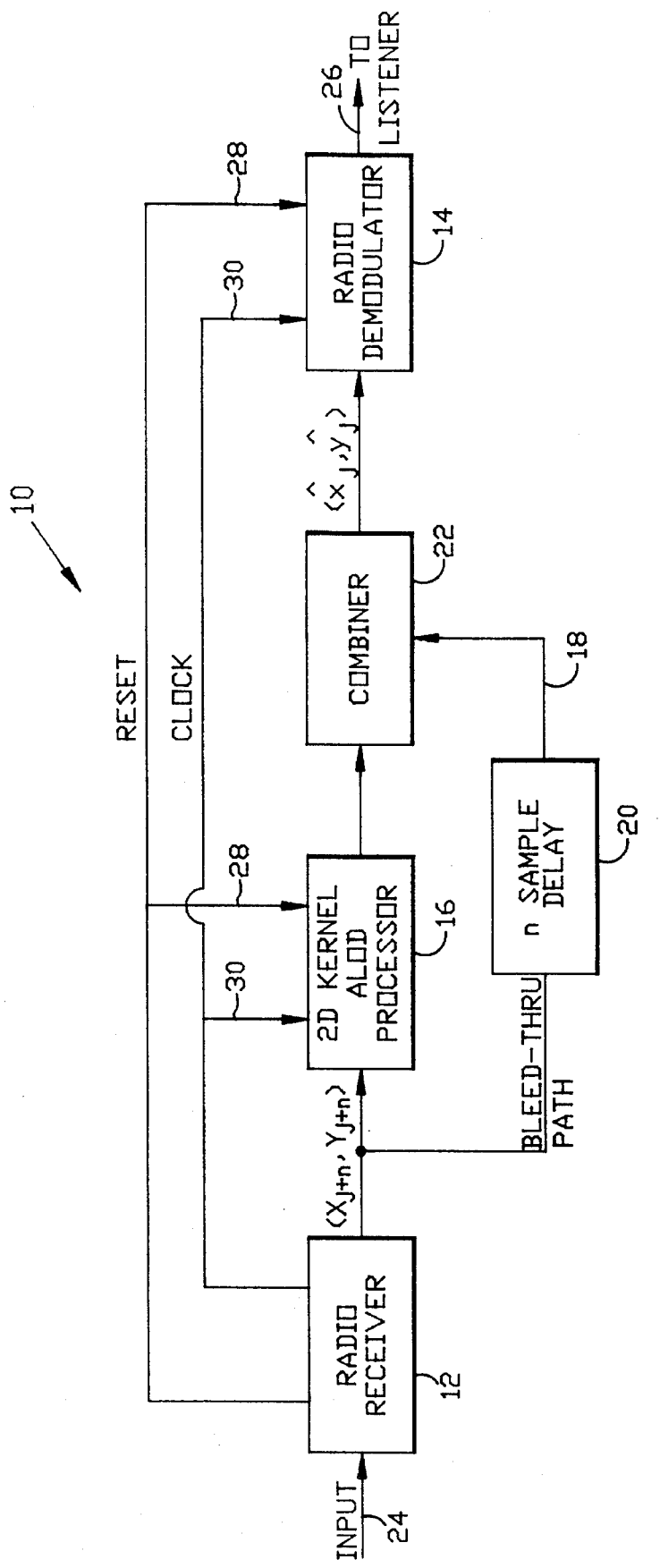
FIG. 1 is a block diagram of an interference suppression system according to the invention.

In FIG. 1 there is shown an interference suppression system 10 according to a preferred embodiment of the invention. System 10 includes components of a typical radio, including a receiver 12 and a demodulator 14. A Two-Dimensional Kernel Adaptive Locally Optimum Detection (ALOD) interference processor 16, according to the invention, is inserted between receiver 12 and demodulator 14 preferably as a stand-alone unit. Alternatively, hardware components of processor 16 could be housed on a card that could be inserted into a vacant slot of radio 12. If this alternative embodiment is used, processing can be implemented either before or after chip demodulation.

To provide satisfactory performance in cases where interfering noise is primarily Gaussian, Two-Dimensional Kernel ALOD Processor 16 should be used in conjunction with bleed-through path 18. This path includes a delay 20 that is equated with the processing delay taking place in processor 16. Signals delayed through bleed-through path 18 and those output from processor 16 are normalized and combined conventionally in combiner 22. Normalization in this regard is with respect to the relative energies from processor 16's output and from the signal through bleed-through path 18, these energies being averaged over received signal samples used in the processor. Bleed-through path 18 and combiner 22 are needed for the invention to work in cases where communication signals are nearly as strong or are stronger than noise and interference. The bleed-through path is constantly employed and has little effect on system operation until the described conditions take place.

A preferred embodiment of the invention is designed for the reception of band-spread signals having each information bit spread by a factor of 10 or more. Of course, other spread factors may be used. For the invention to be usable with a radio, the radio must include a bypass of processor 16 for reception of communication signals which are not spread. This bypass, not shown, may be constructed according to conventional techniques.

Radio receiver 12 converts input signals 24 into a sequence of in-phase and quadrature samples, designated here as $x_j$ and $y_j$, respectively, with j being an arbitrary index. This input pair is also called a complex sample of the received signal for index j and can be viewed as a vector with x-component $x_j$ and y-component $y_j$. Signals $x_j$ and $y_j$ are the centermost pair of a representative number (2n+1) of receive signal samples taken: $(x_{j-n}, y_{j-n}) \ldots (x_j, y_j) \ldots (x_{j+n}, y_{j+n})$.

Demodulated output 26 of system 10 is of a sequence of transformed in-phase and quadrature samples designated as $x_j\hat{}$ and $y_j\hat{}$, respectively. A reset signal 28 and a clock signal 30, from radio 12, are used in processor 16 to synchronize its operation with radio receiver 12 and demodulator 14.

Let $r_j^2 = x_j^2 + y_j^2$, with $r_j \geq 0$ and being the magnitude of input pair $(x_j, y_j)$, and let $\Theta_j$ be the unique solution of $\Theta_j = \arctan(x_j/y_j)$ expressed in radians between $-\pi$ and $\pi$. Let phase-difference $\Delta\Theta_j = \Theta_j - \Theta_{j-d}$, where d is a positive integer chosen as small as possible so that there is no self-correlation of the communication signal between sample j and j–d for any value of j. The processor shown in FIG. 1 forms a gain factor $g(r_j, \Delta\Theta_j)$ and a gain factor $h(r_j, \Delta\Theta_j)$ which relate the input sequence $(x_j, y_j)$ to demodulated output sequence $(x_j\hat{}, y_j\hat{})$ as given by the relation:

$$(x_j\hat{}, y_j\hat{}) = g(r_j, \Delta\Theta_j)(x_j/r_j, y_j/r_j) + h(r_j, \Delta\Theta_j)(-y_j/r_j^2, x_j/r_j^2).$$

The gain factors are not only functions of $(r_j, \Delta\Theta_j)$ but of $\{(r_k, \Delta\Theta_k) | j-n \leq k \leq j+n\}$, where 2n+1 is the representative number of samples used in the ALOD algorithm of processor 16. The value of n is an arbitrary number but is preferably a power of 2 as will be further discussed.

Output 26 of interference suppression system 10 is delayed relative to its input 24 by at least n samples in delay 20. Delay 20 should be equated with the chosen delay. Demodulator 14 should be modified in a conventional way to account for this delay to allow for the despreading of processed communication signals.

Figure 2:
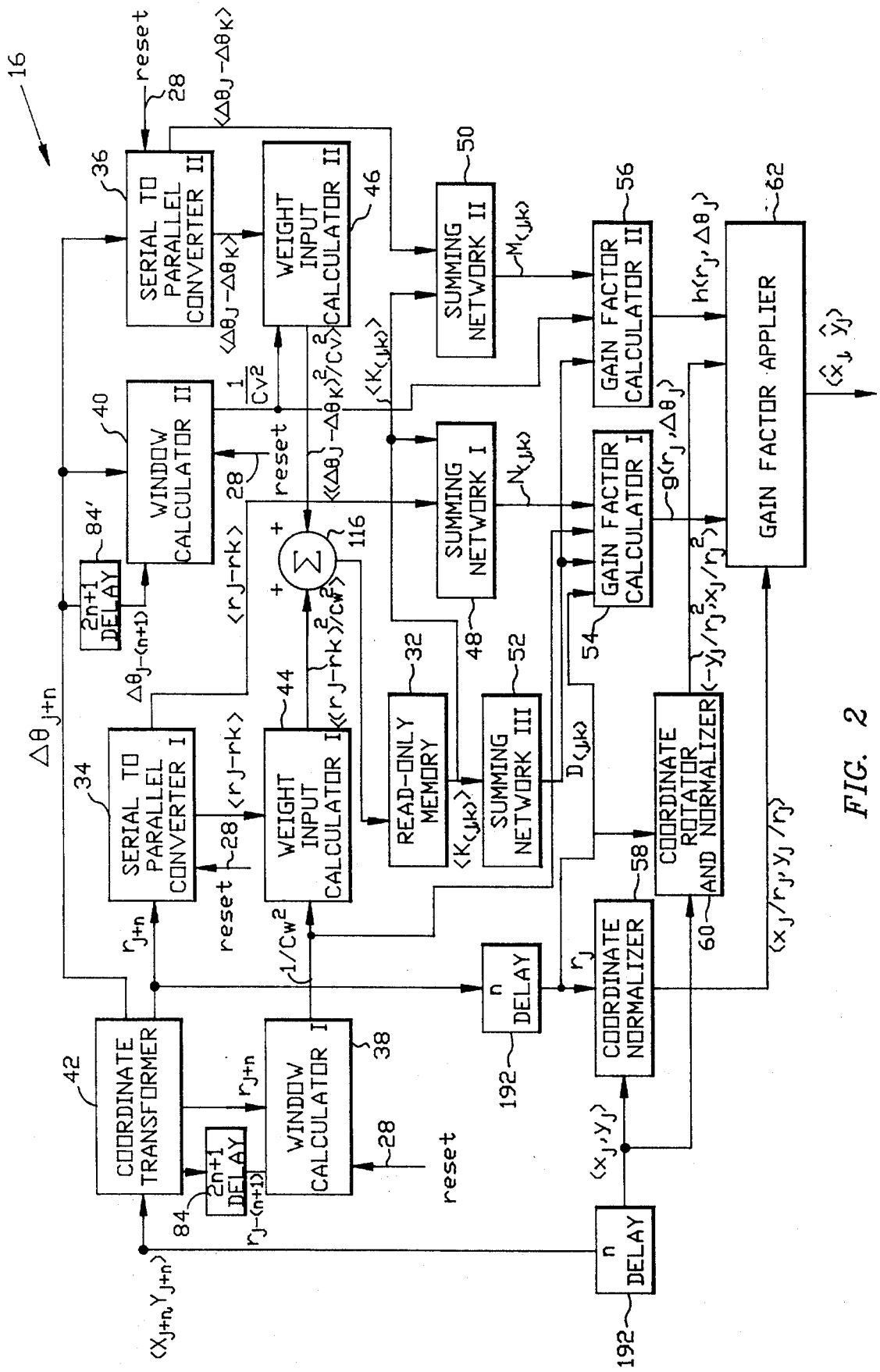
FIG. 2 is a representative implementation of a processor according to the invention.

Illustrated in FIG. 2 is a general block diagram of Two-Dimensional Kernel ALOD Processor 16, showing major components of the processor. In the preferred embodiment shown, all input and output quantities are 16-bit integers and all calculations performed by the components of the invention are done with 16-bit precision. Of course, those skilled in the art will realize that these quantities may be changed dependent upon component availability, computation time required and/or other factors.

The operation of the different components of processor 16 are synchronized through the use of clock signal 30 derived from the internal clock of radio receiver 12, these elements being shown generally in FIG. 1. In the embodiment described, read-only memory 32 is clocked at 2n times the speed of other components in processor 16. Should this clock speed become a limiting factor, Read-only Memory 32 may be replaced by other memory, such as discrete memory, clocked at the same or different rate of other components in the processor. Reset signal 28 is sent to four components of processor 16: Serial-to-parallel Converters 34 and 36 and Window Calculators 38 and 40.

The invention will be described in three steps. First, the inputs and outputs will be described for the functional blocks of FIG. 2. Second, the hardware and functions of each block, whose properties are not apparent, will be described. Third, a flow chart procedure will be described outlining processing steps of the invention.

Inputs and outputs of each of the major functional blocks shown in FIG. 2 are given below. These blocks are:

Coordinate Transformer (42):

Input: $(x_{j+n}, y_{j+n})$

Outputs: $r_{j+n} = +\sqrt{x_{j+n}^2 + y_{j+n}^2}$ $\Delta\Theta_{j+n} = \Theta_{j+n} - \Theta_{j+n-d}$ The "j+n"th sample pair is the most recently acquired sample and is shown as the sample input into processor 16. As the invention cancels interference based upon the properties of the received sample magnitudes, such as signal amplitudes, and upon phase-differences of the received signal samples, Coordinate Transformer 42 calculates these values, as will be further discussed.

Window Calculator I (38):

Inputs: $r_{j+n}$, $r_{j-(n+1)}$, reset signal

Output: $1/Cw^2$

Throughout this specification, the value C is taken to be any positive value and can be experimented with to find an optimum value for a particular system. In particular, where C(n) denotes the value of C when n samples on each side of $(r_j, \Delta\Theta_j)$ are used to estimate magnitude and phase-difference statistics, the following values for C give effective performance: C(4)=0.45, C(8)=0.32, C(16)=0.28 and C(32)=0.24.

Window Calculator I (38) provides an estimation of the variance of the joint probability density function (PDF) as a function of magnitude (amplitude). Reset signal 28 reinitializes this process whenever radio 12 shown in FIG. 1 is tuned to a new frequency.

Window Calculator II (40):

Inputs: $\Delta\Theta_{j+n}$, $\Delta\Theta_{j-(n+1)}$, reset signal

Output: $1/Cv^2$

Window Calculator 40 gives an estimation of the variance of the joint PDF as a function of phase-difference. Reset signal 28 is used to restart the estimation process when a radio used in conjunction with processor 16 is tuned to a new frequency.

Serial-to-parallel Converter I (34):

Inputs: the sequence of sample magnitudes $\{r_j\}$ input over time, reset signal Output: the sequence of vectors centered about sample magnitude $r_j$, which is written as $<r_j-r_k> = (r_j-r_{j-n}, r_j-r_{j-(n-1)}, \ldots, r_j-r_{j+1}, r_j-r_{j+1}, \ldots r_j-r_{j+n})$ in which the symbols "< >" designate throughout this specification the vector form of a received signal. This sequence of signal magnitude differences, in this case amplitude differences, is used to calculate the transforms to be applied to time delayed sample pair $(x_j/r_j, y_j/r_j)$ and delayed and rotated sample pair $(-y_j/r_j, x_j/r_j)$, as will be further explained. In a preferred embodiment of the invention the integer n, used in Serial-to-parallel Converter I and Serial-to-parallel Converter II to be discussed, is a power of 2. Though making n a power of 2 is not mandatory, this selection makes implementation of the invention relatively simple. Successful versions of the invention have resulted for values of n=4, 8, 16 and 32.

Reset signal 28 reinitializes the process within Serial-to-parallel Converter I (34) whenever radio receiver 12 and radio demodulator 14 of FIG. 1 are tuned to a new frequency.

Serial-to-Parallel Converter II (36):

Inputs: the sequence of real numbers $\{\Delta\Theta_j\}$ input over time, reset signal Outputs: The sequence of vectors centered about the sample magnitude $\Delta\Theta_j$, which is written as $<\Delta\Theta_j-\Delta\Theta_k>=(\Delta\Theta_j-\Delta\Theta_{j-n}, \Delta\Theta_j-\Delta\Theta_{j-(n-1)}, \ldots, \Delta\Theta_j-\Delta\Theta_{j-1}, \Delta\Theta_j-\Delta\Theta_{j+1}, \ldots, \Delta\Theta_j-\Delta\Theta_{j+n})$. Reset signal 28 reinitializes the process within serial-to-parallel converter 36 when radio 12 and demodulator 14 of FIG. 1 are tuned to a new frequency.

Weight Input Calculator I (44):

Inputs: $1/Cw^2$, $<r_j-r_k>$

Output: the vector $<(r_j-r_k)^2/Cw^2)>$

Throughout this specification, the symbol "k" is a running index based upon j that runs from k=j−n to k=j+n.

Weight Input Calculator II (46):

Inputs: $1/Cv^2$, $<\Delta\Theta_j-\Delta\Theta_k>$

Output: the vector $<(\Delta\Theta_j-\Delta\Theta_k)^2/Cv^2)>$

Read-only Memory (32):

Input: $<(r_j-r_k)^2/Cw^2+(\Delta\Theta_j-\Delta\Theta_k)^2/Cv^2)>=$(the added outputs of Weight Input Calculators I [44] and II [46])

Output: $<K(j,k)>$ with $K(j,k)=e^{-f(j,k)}$ with $f(j,k)=(\frac{1}{2})[(r_j-r_k)^2/w^2+(\Delta\Theta_j-\Delta\Theta_k)^2/v^2)]$ The vector of kernels $<K(j,k)>$ summarizes the statistical information available about the magnitudes (in this case amplitudes) and the phase-differences of the signals being received by the radio 12 from the 2n+1 samples centered about $(r_j, \Delta\Theta_j)$. It is this information that allows the received signal sample pairs to be transformed so as to suppress interference.

Summing Network I (48):

Inputs: $<r_j - r_k>$, $<K(j,k)>$

Output: $N(j,k) = \text{sum}_k [<r_j - r_k>K(j,k)]$

It should be noted that throughout this specification, the notation $\text{sum}[_k]$ means to sum the quantity enclosed by the brackets over the integers from k=j−n to k=j+n.

Summing Network II (50):

Inputs: $<\Delta\Theta_j - \Delta\Theta_k>$, $<K(j,k)>$

Output: $M(j,k) = \text{sum}_k [(\Delta\Theta_j - \Delta\Theta_k)K(j,k)]$

Summing Network III (52):

Input: $<K(j,k)>$ $$\text{Output: } D(j,k) = \underset{k}{\text{sum }} [K(j,k)]$$

Gain Factor Calculator I (54):
  Inputs: $N(j,k), D(j,k), 1/Cw^2, r_j$
  Output: magnitude gain factor $g(r_j, \Delta\Theta_j)$. This gain factor is given by $-N(j,k)/(Cw^2 D(j,k)) - 1/r_j$.
Gain Factor Calculator II (56):
  Inputs: $M(j,k), D(j,k), 1/Cv^2$
  Output: phase-difference gain factor $h(r_j, \Delta\Theta_j)$. This gain factor is given by $-M(j,k)/(Cv^2 D(j,k)) + M(j+d,k)/(Cv^2 D(j+d,k))$.
Coordinate Normalizer (58):
  Input: $(x_j, y_j), r_j$
  Output: $(x_j/r_j, y_j/r_j)$
Coordinate Rotator and Normalizer (60):
  Input: $(x_j, y_j), r_j$
  Output: $(-y_j/r_j^2, x_j/r_j^2)$
Gain Factor Applier (62):
  Inputs: $g(r_j, \Delta\Theta_j), h(r_j, \Delta\Theta_j) (x_j/r_j, y_j/r_j) (-y_j/r_j^2, x_j/r_j^2)$
  Output: $(x_j\hat{}, y_j\hat{}) = (x_j g(r_j)/r_j, y_j g(r_j)/r_j), (-y_j h(r_j)/r_j^2, x_j h(r_j)/r_j^2)$ Gain factor applier 62 applies the transforms of the processor of the invention to the received signal samples.

The hardware and operation of each of the major components shown in FIG. 2, whose properties are not self-evident, will now be described. The components shown are assembled from conventional elements according to traditional techniques.

Figure 3:
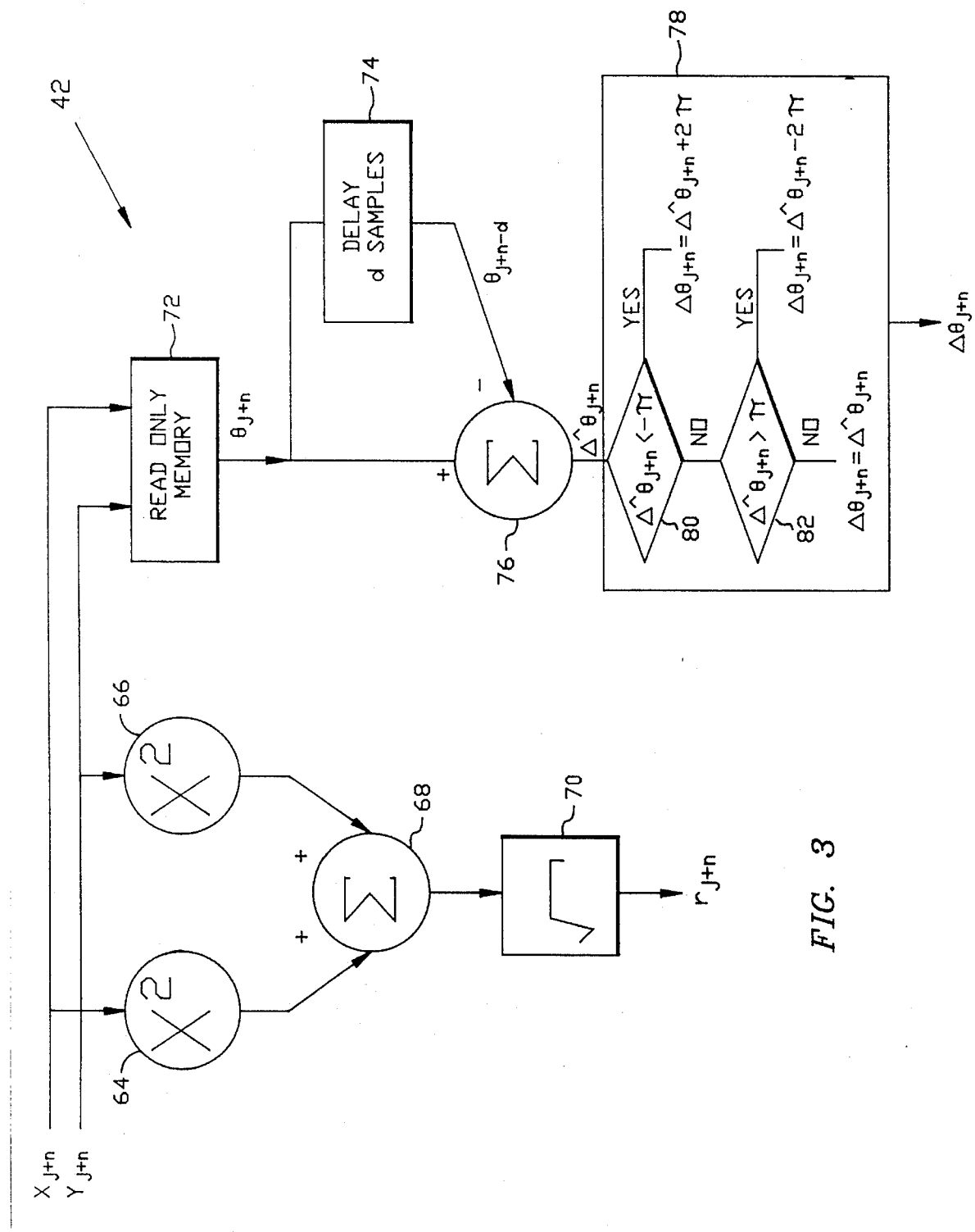
FIG. 3 is a block diagram of a coordinate transformer such as may be used in a representative embodiment of the invention.

Coordinate Transformer (42):

A detailed view of coordinate transformer 42 is shown in FIG. 3. Each component of sample input pair $(x_{j+n}, y_{j+n})$ goes to a squaring circuit 64 and 66, respectively. The squaring circuit outputs are added in adder 68 and the square root taken in square root processor 70 to give the magnitude (amplitude) $r_{j+n}$ of processed signal sample $(x_{j+n}, y_{j+n})$.

The sequence of vectors $<x_j, y_j>$, of which $(x_{j+n}, y_{j+n})$ is a part, are used to address a read-only memory 72. For each of the vectors addressing memory 72, there is a principle value of arctan $(y_j/x_j)$ stored and output from the memory. For the particular vector $(x_{j+n}, y_{j+n})$, the value of arctan $(y_{j+n}, x_{j+n})$ will be stored at the $(x_{j+n}, y_{x+n})$ address. The delay 74 permits the value of $\Theta_{j+n-d}$ to be subtracted from the output of memory 72 in summer 76 to provide $\Delta\hat{}\Theta_{j+n}$. This difference may not fall between $-\pi$ and $\pi$ and therefore it is compared in logic circuit 78 with these values and adjusted if necessary.

Toward this end $\Delta\hat{}\Theta_{j+n}$ is input to a comparator 80 which is labeled as "$\Delta\hat{}\Theta_{j+n} < -\pi$". If the input to this comparator is less than $-\pi$, the output of comparator 80 is routed to an adder, not shown, which adds $2\pi$ to it and passes this to logic circuit 78's output. If input to logic circuit 78 is greater than $-\pi$, then the output of comparator 80 is routed to a second comparator 82 which is labeled as "$\Delta\hat{}\Theta_{j+n} > \pi$" in FIG. 3. If the input to comparator 82 is greater than $\pi$, then the output of this comparator is routed to an adder, not shown, which subtracts $2\pi$ from the comparator's output, this being passed to circuit 78's output. If the output of comparator 82 is less than $\pi$, then it is routed directly to output $(\Theta\Delta_{j+n})$ of Coordinate Transformer 42.

Figure 4:
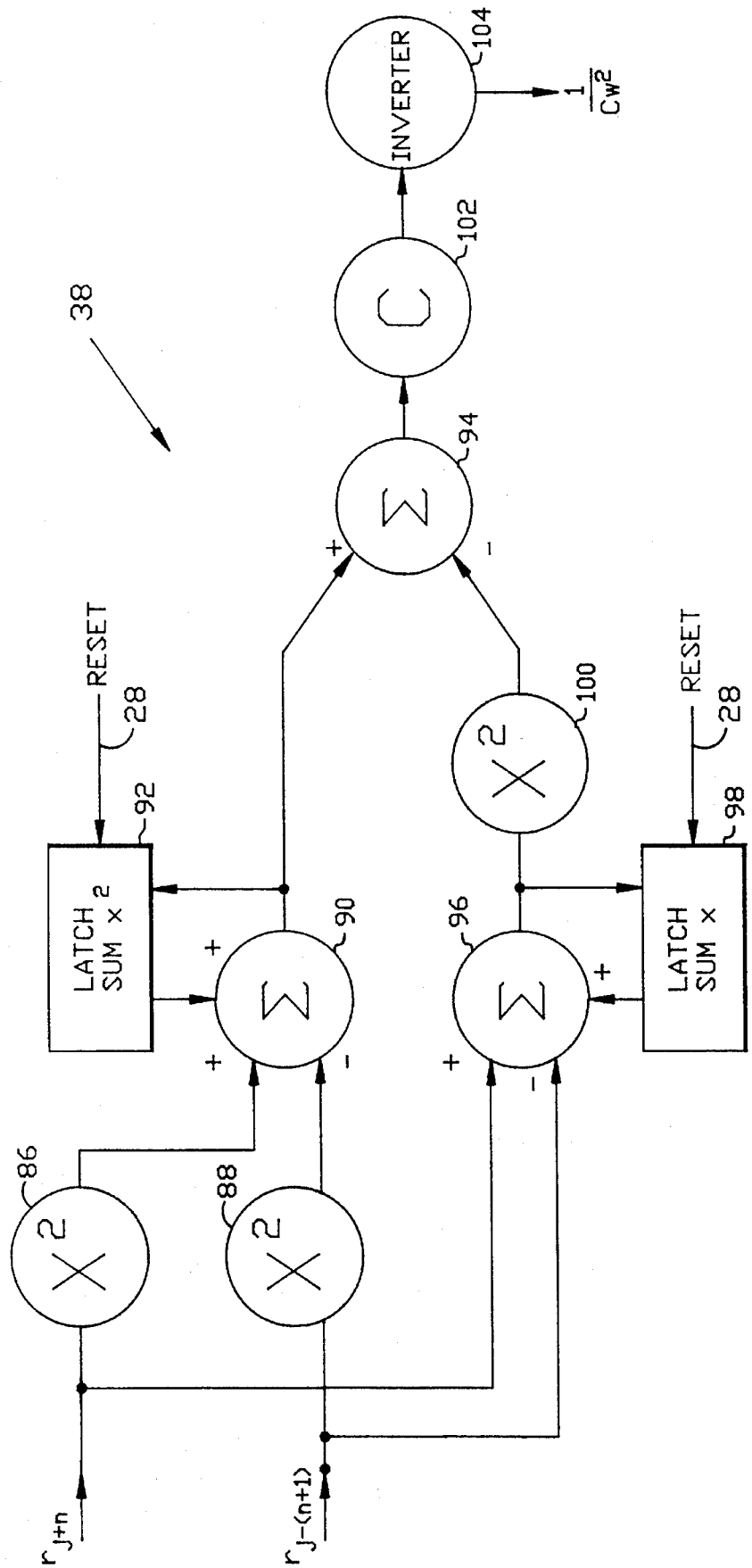
FIG. 4 is a block diagram of a first window calculator such as may be used in the invention.
Figure 5:
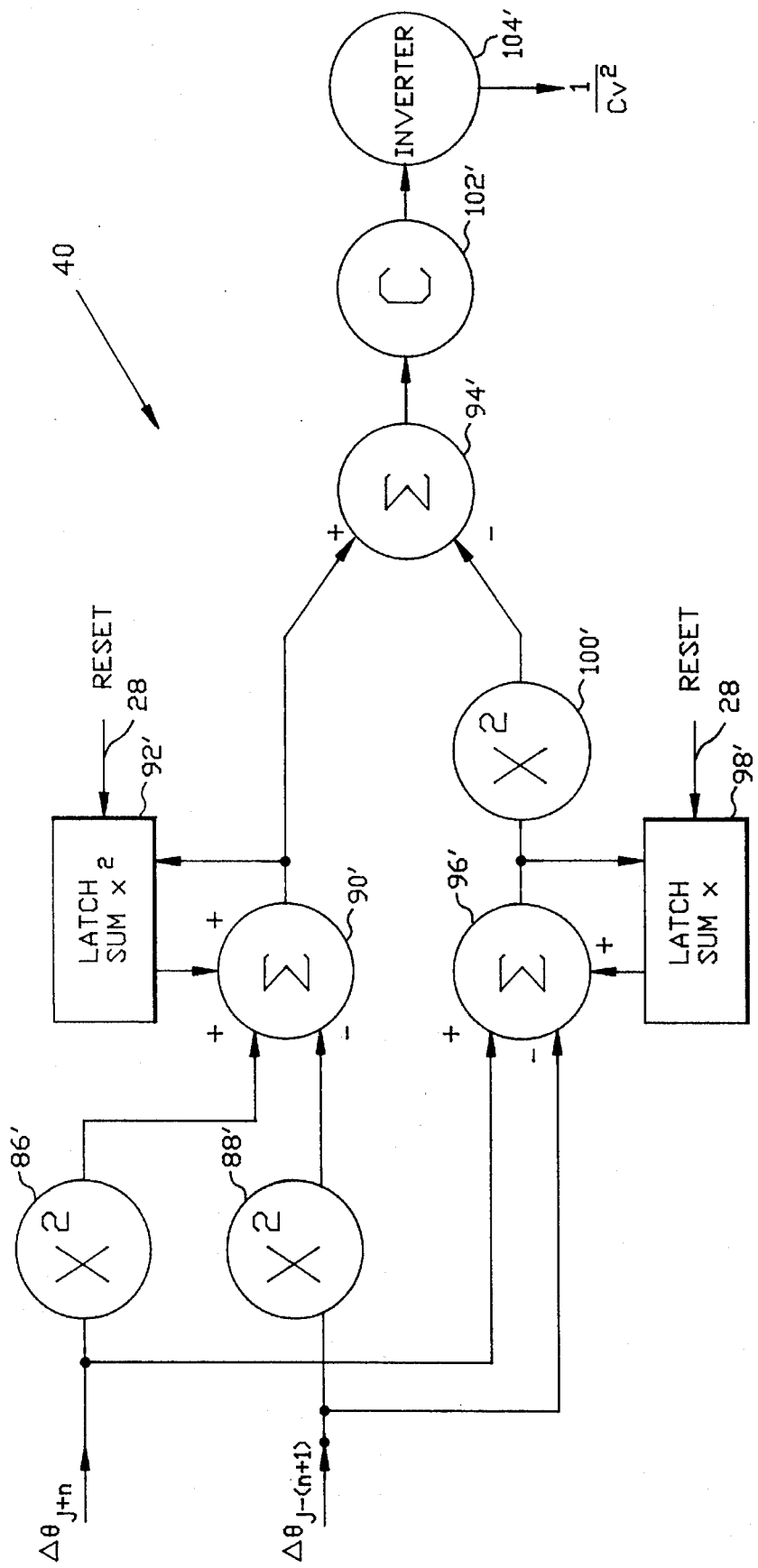
FIG. 5 is a block diagram of a second window calculator such as may be used in the invention.

Window Calculators I (38) and II (40):

Window Calculators I (38) and II (40) have identical hardware and are shown in detail in FIGS. 4 and 5, respectively. Window Calculator I (38) is shown to have the exemplary inputs $r_{j+n}$ and $r_{j-(n+1)}$ with output $1/Cw^2$. Similarly, Window Calculator II (40) has exemplary inputs $\Delta\Theta_{j+n}$ and $\Delta\Theta_{j-(n+1)}$ with output $1/Cv^2$. As the hardware and operation of Window Calculators I and II are identical, only Window Calculator I will be discussed unless otherwise noted.

Window Calculator I (38) gives an estimation of variance, that is the square of the standard deviation of the received samples, of the joint PDF as a function of signal magnitude, in this case signal amplitude. This variance is calculated recursively within Window Calculator 38. In FIG. 2, Coordinator Transformer 42 outputs the (j+n)th amplitude value $r_{j+n}$ and causes a delayed amplitude value $r_{j-(n+1)}$ from 2n+1 sample delay 84. As can be seen in FIG. 2, these amplitude values are input into Window Calculator I (38).

In FIG. 4 these sample magnitudes $r_{j+n}$ and $r_{j-(n+1)}$ are input into squaring circuits 86 and 88, respectively. The output of squaring circuit 86 is added in summer 90 to the negative of the output of squaring circuit 88. Summer 90's output is latched into latch 92 and is also passed to summer 94 as will be further discussed.

Receive amplitude samples $r_{j+n}$ and $r_{j-(n+1)}$ are also routed to summer 96 where positive and negative values of the samples, respectively, are added. The output of summer 96 is latched within latch 98 and is also passed to squaring circuit 100. The positive and negative values of sum $X^2$ and (sum $X)^2$, respectively, are added in summer 94 and are multiplied by constant C (102). This gives estimated variance $Cw^2$ that is passed through invertor 104 to give output $1/Cw^2$.

In operation, Window Calculator 38 stores the last used "sum $X^2$" and "sum X". These values were used to estimate the window employed in the calculation of the previously used gain factor. These values are then updated by using the samples $r_{j+n}$ and $r_{j-(n+1)}$ in the following manner:

$$\text{sum } X^2_{new} \rightarrow \text{sum } X^2_{old} + r_{j+n}^2 - r_{j-(n+1)}^2$$

$$\text{sum } X_{new} \rightarrow \text{sum } X_{old} + r_{j+n} - r_{j-(n+1)}.$$

An estimate of the variance of the received amplitude values are then obtained by forming $$\text{sum } X^2 - (\text{sum } X)^2.$$

Reset signal 28 is routed to latches 92 and 98, holding values "sum $X^2$" and "sum X", respectively, to set their contents to zero. This restarts the process of calculating the variance of the receive amplitude values when the radio coupled to the invention is tuned to a new frequency.

For Window Calculator II (40), of FIG. 5, the values of $\Delta\Theta_{j+n}, \Delta\Theta_{j-(n+1)}$ are substituted for the values of $r_{j+n}$ and $r_{j-(n+1)}$ of FIG. 4. Rather than the variance of magnitude value $r_j$ being estimated, Window Calculator II gives an estimate of the variance of phase-difference $\Delta\Theta_j$. Window Calculator II calculates the window $1/Cv^2$, where $v^2$ is the variance of the phase-difference $\Delta\Theta_j$ and C is the aforementioned constant.

Figure 6:
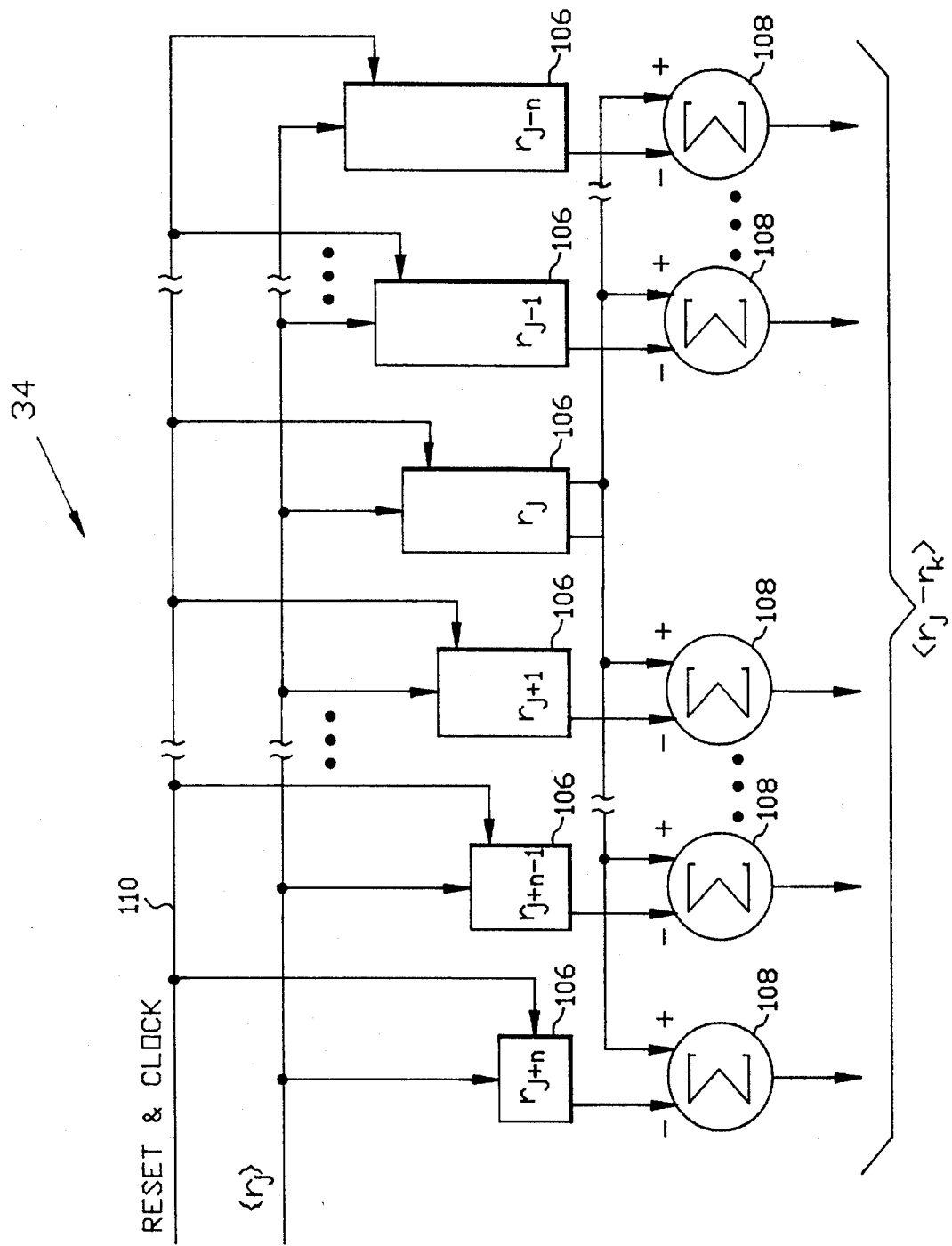
FIG. 6 is a block diagram of a first serial-to-parallel converter such as may be used in the invention.
Figure 7:
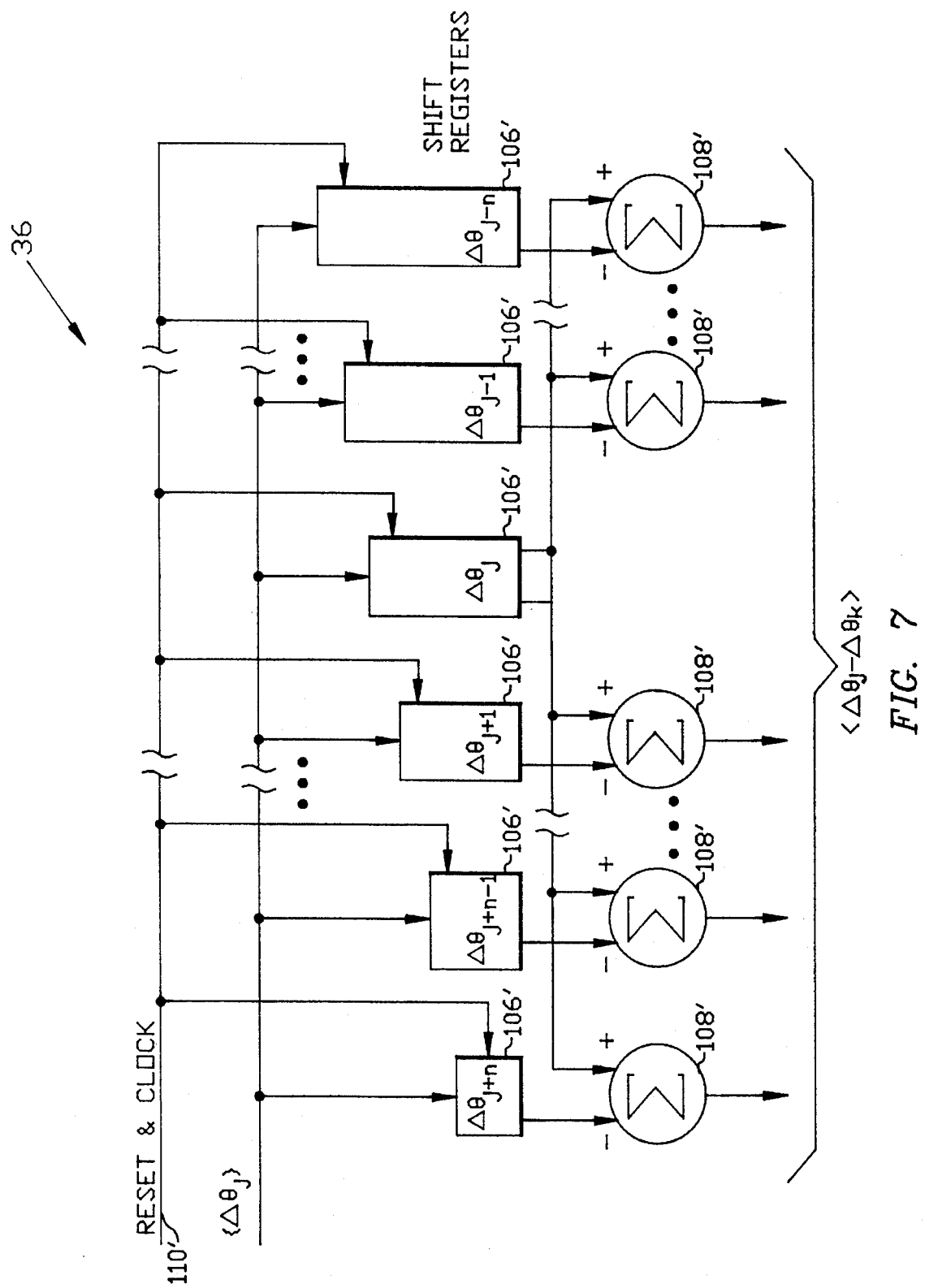
FIG. 7 is a block diagram of a second serial-to-parallel converter such as may be used in the invention.

Serial-to-parallel Converters I (34) and II (36):

Serial-to-parallel Converters I and II shown in FIG. 2 are shown in detail in FIGS. 6 and 7, respectively. Serial-to-parallel Converters 34 and 36 have identical hardware structures. Therefore, discussion will be directed to converter 34 and the reader may assume that the operation and hardware associated with converter 36 is identical to that of serial-to-parallel converter 34 unless otherwise noted.

Referring to FIG. 6, recall that the input to Serial-to-parallel Converter I (34) is the sequence of magnitudes (amplitudes) $\{r_j\}$ with the output of the converter being the sequence of vectors $<r_j-r_k>=(r_j-r_{j-n}, r_j-r_{j-(n-1)} \ldots, r_j-r_{j-1}, r_j-r_{j+1}, \ldots, r_j-r_{j+n})$. This sequence of vectors has $2n$ terms and is formed by subtracting the center input magnitude (amplitude) from the end magnitudes on each of its sides.

In FIG. 6 it can be seen that Serial-to-Parallel Converter I (34) contains $2n+1$ shift registers 106 of lengths 1 through $2n+1$. The outputs of shift registers 106 are fed to $2n$ adders 108 to create the differences $r_j-r_k$, $k=j-n, \ldots, j-1, j+1, \ldots, j+n$. Line 110 includes reset signal 28 of FIG. 2 that resets the contents of each of the $2n+1$ shift registers to zeros. This re-initializes the data used to estimate the ALOD transform when a radio utilizing the processor of the invention is tuned to a new frequency.

In FIG. 7, Serial-to-parallel Converter II (36) is shown. Serial-to-parallel Converter 36, like Serial-to-parallel Converter 34, contains $2n+1$ shift registers 106' fed to $2n$ adders 108'. In Serial-to-parallel Converter 36 the sequence of phase-differences $\{\Delta\Theta_j\}$ are input into the converter with the output of the converter being the sequence of vectors $<\Delta\Theta_j-\Delta\Theta_k>$.

Figure 8:
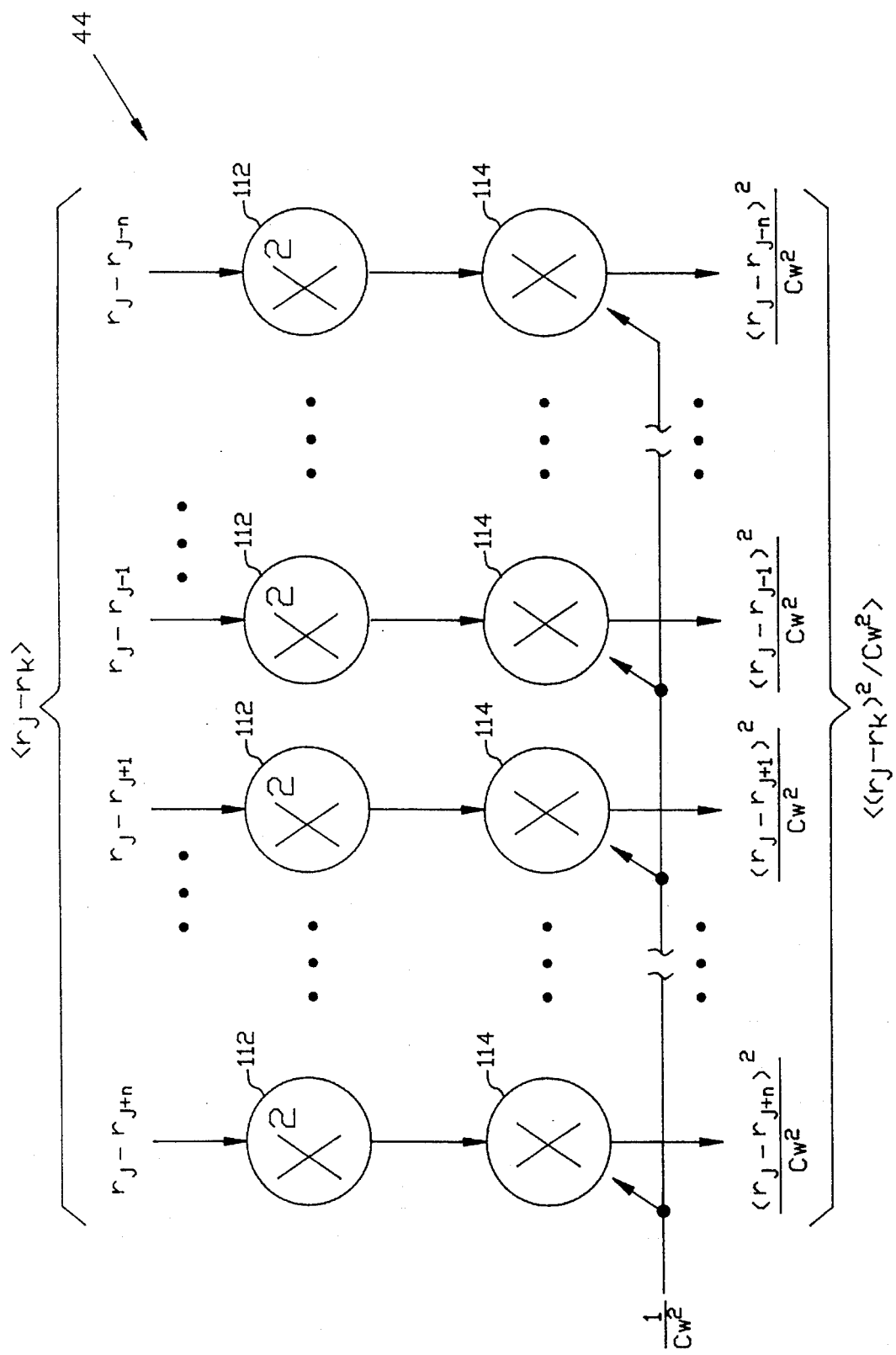
FIG. 8 is a block diagram of a first weight input calculator as may be used in the invention.
Figure 9:
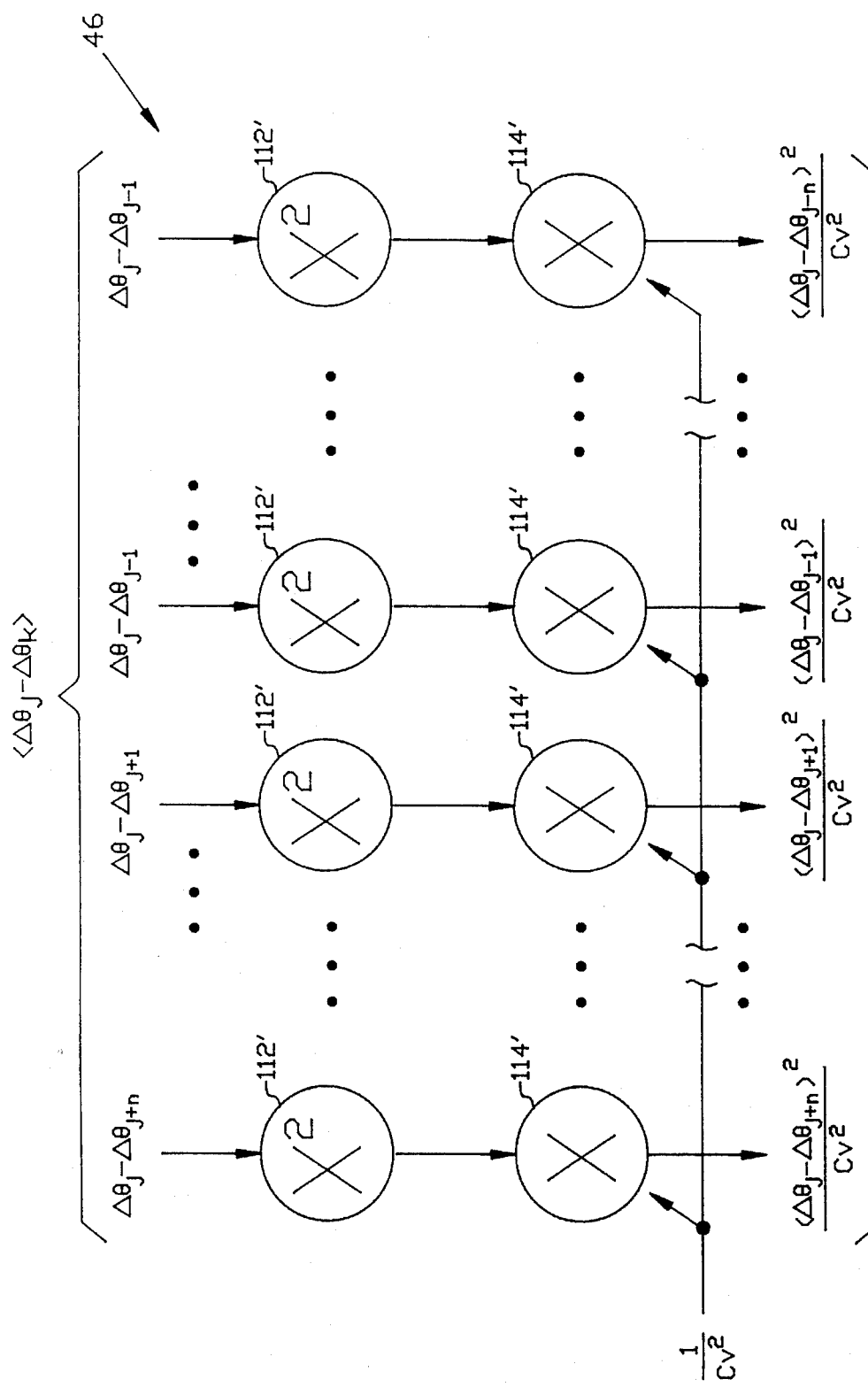
FIG. 9 is a block diagram of a second weight input calculator as might be used in the invention.

Weight Input Calculators I (44) and II (46):

Weight Input Calculators I (44) and II (46) shown in FIG. 2 are shown in detail in FIGS. 8 and 9, respectively. The Weight Input Calculators I and II have identical structure and each include a series of $2n$ squaring circuits 112, 112' followed by $2n$ multipliers 114, 114'.

As shown in FIG. 2, the output of Serial-to-parallel Converter I (34), the sequence of vectors centered about sample magnitude $r_j$, ($<r_j-r_k>$), and the output of Window Calculator I (38), variance factor $1/Cw^2$, are the inputs to Weight Input Calculator I (38). The details Weight Input Calculator I (38) are shown in FIG. 8.

The components of input vector sequence $<r_j-r_k>$ are presented to $2n$ squaring circuits 112, the outputs of which are then multiplied by $1/Cw^2$ in $2n$ multipliers 114. These steps produce the normalized vector:

$<(r_j-r_k)^2/Cw^2>$.

In FIG. 2 it can be seen that Weight Input Calculator II (46) receives as its input the sequence of vectors centered about the sample phase-difference $\Delta\Theta_j$ ($<\Delta\Theta_j-\Delta\Theta_k>$) from Serial-to-parallel Converter II (36) as well as the variance related factor $1/Cv^2$ from Window Calculator II (40). The details of Weight Input Calculator II (40) are shown in FIG. 9. These steps produce a sequence of normalized vectors:

$<(\Delta\Theta_j-\Delta\Theta_k)^2/Cv^2>$.

Read-only Memory (32):

Referring to FIG. 2 the outputs of Weight Input Calculators I (44) and II (46) are added in summer 116 to provide an input to Read-only Memory 32. The sum of $<(r_j-r_k)^2/Cw^2>$ and $<(\Delta\Theta_j-\Delta\Theta_k)^2/Cv^2>$ addresses Read-only Memory 32 in which is stored an array of values for the function $\exp(-x)$, where $x$ ranges from zero to some predetermined positive constant. The value for this constant and the granularity of this table of values should be determined by the user, but it has been found that an upper limit of $x=100$ with 10,001 values in this table, each 0.01 apart, has proven to be satisfactory for purposes of this invention.

The process in ROM 32 of FIG. 2 produces the components of the vector $<K(j,k)>$ with $K(j,k)=e^{-f(j,k)}$ $f(j,k)=(\frac{1}{2})[(r_j-r_k)^2/Cw^2+(\Delta\Theta_j-\Delta\Theta_k)^2/Cv^2]$ The outputs of Read-only Memory 32 are routed to summing networks I (48), II (50) and III (52).

Figure 10:
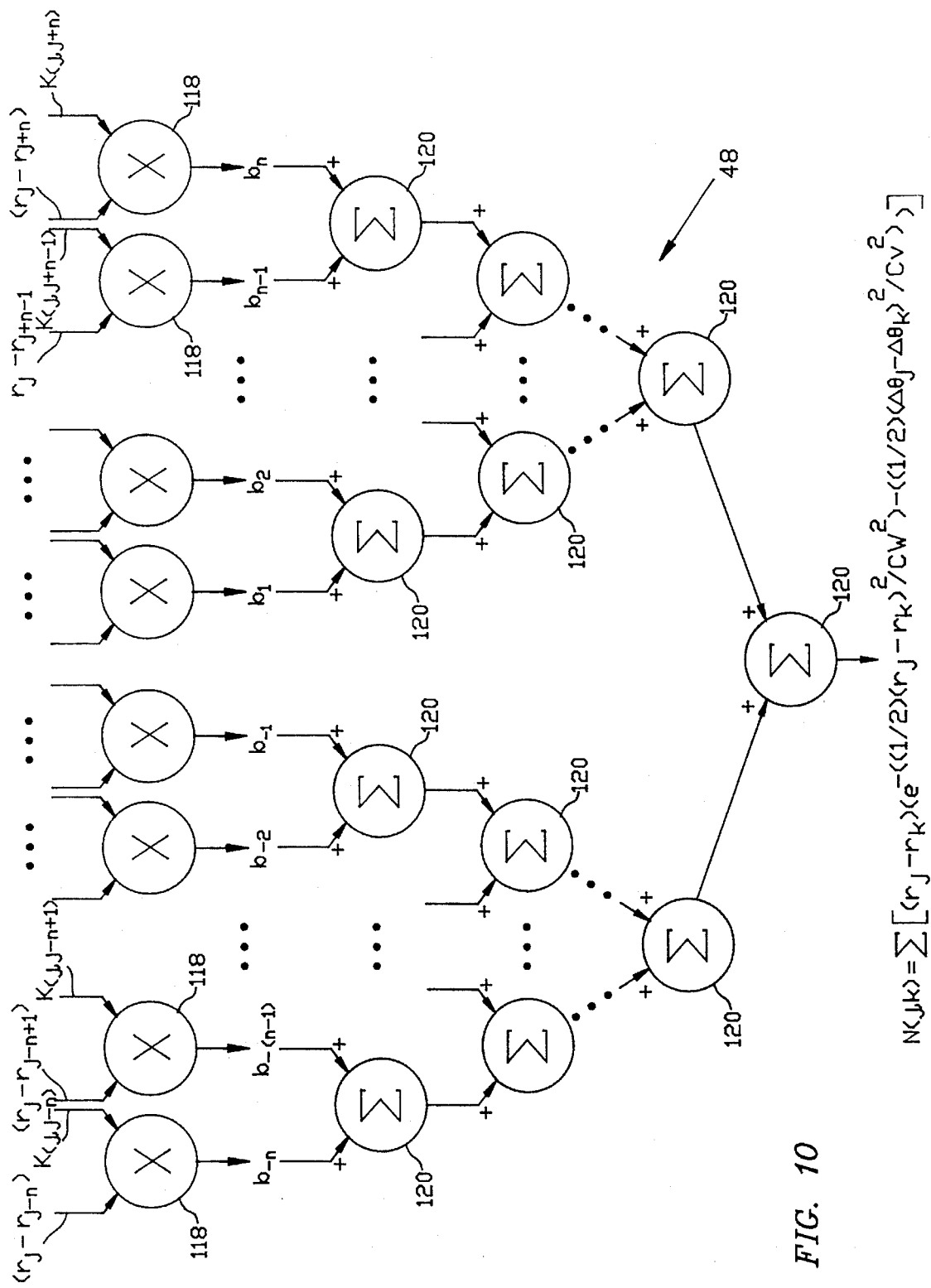
FIG. 10 shows a first summing network with multipliers as may be used in the invention.
Figure 11:
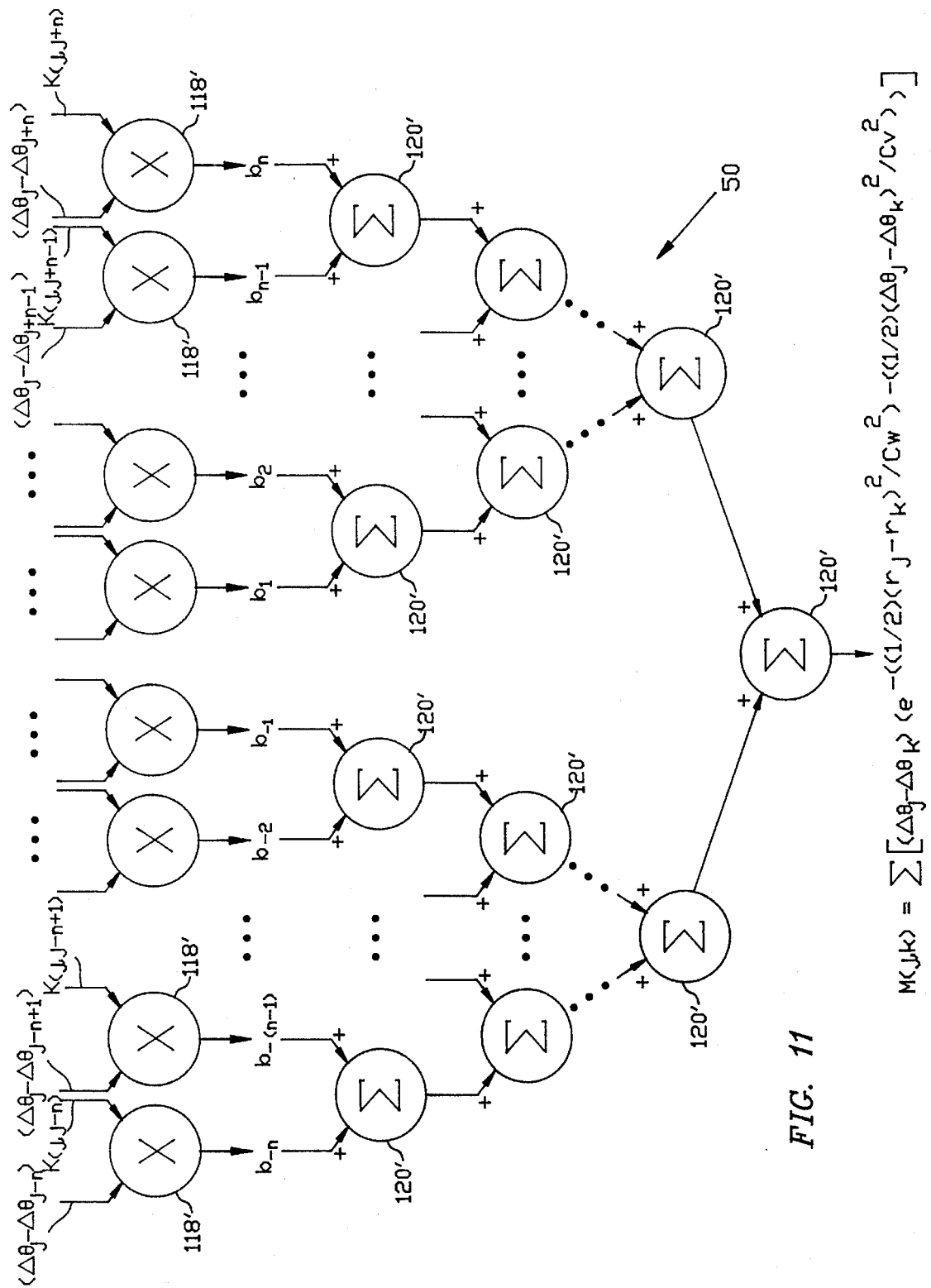
FIG. 11 shows a second summing network with multipliers as may be used in the invention.

Summing Networks I (48) and II (50):

Summing Networks I (48) and II (50) shown in FIG. 2 are also shown in detail in FIGS. 10 and 11, respectively. In FIG. 10 the components of the vector:

$<(r_j-r_k) (e^{-((\frac{1}{2}) (r_j-r_k)^2/Cw^2)-((\frac{1}{2}) (\Delta\Theta_j-\Delta\Theta_k)^2/Cv^2)}]>$ are produced by a series of multipliers 118 operating in parallel from the components of $<r_j-r_k>$, $<K(j,k)>$.

In FIG. 10 the quantities $b_k=(r_j-r_k)e^{-(\frac{1}{2}) (r_j-r_k)^2/Cw^2}$ are input into adders 120 in the first row of Summing Network 48. This Summing Network output is:

$$N(j,k) = \text{sum}_k [(r_j - r_k)(e^{-((1/2)(r_j-r_k)^2/Cw^2)-((1/2)(\Delta\Theta_j-\Delta\Theta_k)^2/Cv^2)})]$$

It should be noted that the term in this sum corresponding to $k=j$ is always zero.

In FIG. 11 Summing Network II (50) is shown in detail and is substantially identical to Summing Network I (48). In FIG. 11 the components of the vector: $<(\Delta\Theta_j-\Delta\Theta_k) (e^{-((\frac{1}{2}) (r_j-r_k)^2/Cw^2)-((\frac{1}{2}) (\Delta\Theta_j-\Delta\Theta_k)^2/Cv^2)})>$ are produced by multipliers 118' operating in parallel from the components of $<\Delta\Theta_j-\Delta\Theta_k>$ and $<K(j,k)>$.

As in Summing Network I (48), Summing Network II (50) includes the quantities $b_k=(r_j-r_k)e^{-((\frac{1}{2}) (r_j-r_k)^2/Cw^2)}$ input to adders 120' in the first row of network 50. Network 50 outputs:

$$M(j,k) = \text{sum}_k [(\Delta\Theta_j - \Delta\Theta_k)(e^{-((1/2)(r_j-r_k)^2/Cw^2)-((1/2)(\Delta\Theta_j-\Delta\Theta_k)^2/Cv^2)})]$$

As in Summing Network 48, it should be noted that in Summing Network 50 the term in this sum corresponding to $k=j$ is always zero.

Figure 12:
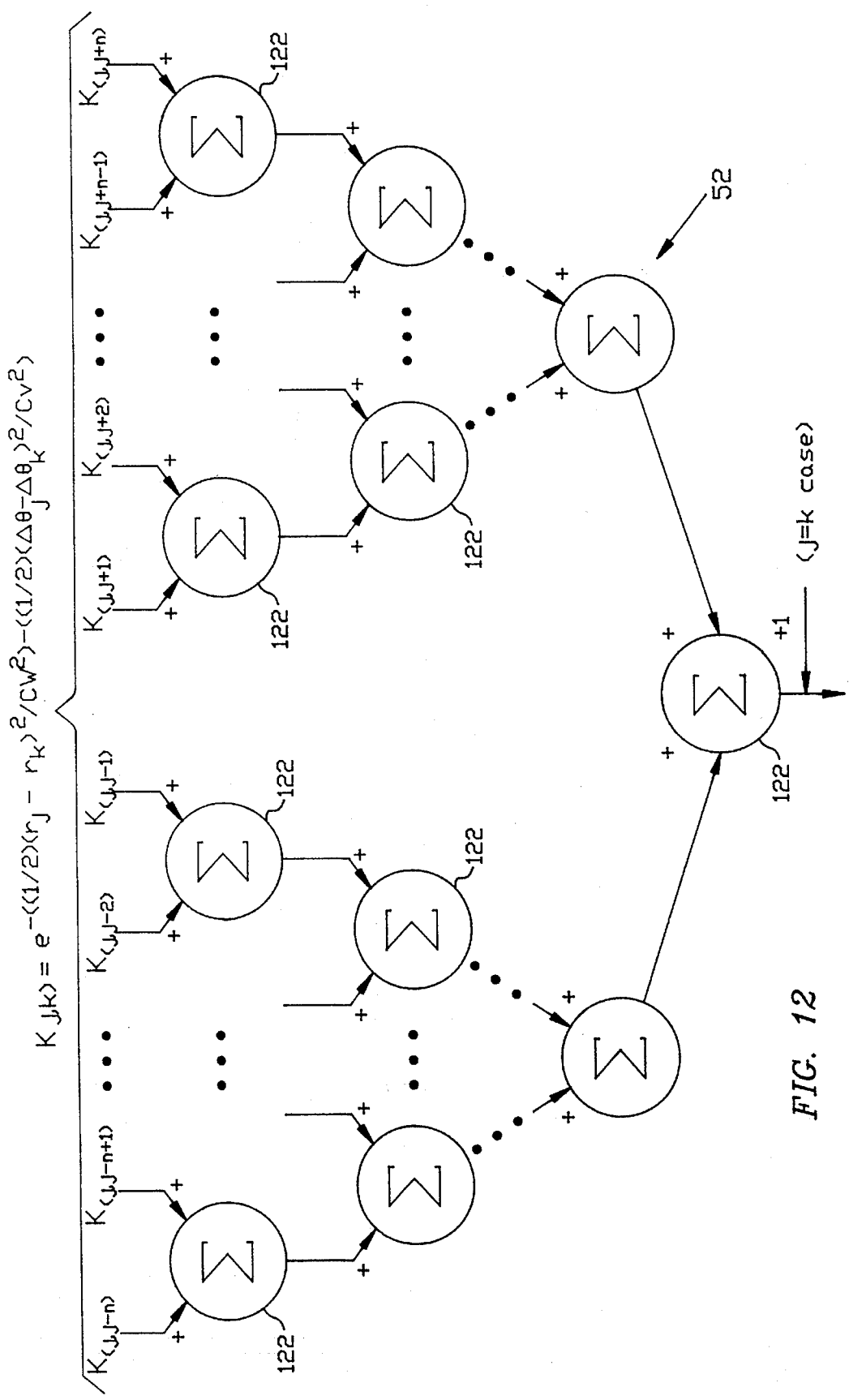
FIG. 12 illustrates a summing network without multipliers as might be used in the invention.

Summing Network III (52) of FIG. 2 is shown in detail in FIG. 12. Summing Network III (52) outputs:

$$D(j,k) = \text{sum}_k e^{-((1/2)(r_j-r_k)/Cw^2)-((1/2)(\Delta\Theta_j-\Delta\Theta_k)/Cv^2)}.$$

Note that in FIG. 12, the addition of the fixed summand 1 corresponds to the case where $k=j$.

The inputs to adders 122 of the top row of network 52 are the components of the vector:

$K(j,k)=e^{-((\frac{1}{2}) (r_j-r_k)^2/Cw^2)-((\frac{1}{2}) (\Delta\Theta_j-\Delta\Theta_k)^2/Cv^2)}$.

The representative structures of Summing Networks I, II and III 52 shown in FIGS. 10, 11 and 12 arise because $n$ is the power of 2. For example, when $n=8$, 16 inputs to the 8 top or first row of adders leads to 8 inputs to the 4 adders in the second row of adders, to 4 inputs to 2 adders in the third row of adders, and to 2 inputs, plus the fixed summand 1 in the case of network 52, to a single adder in the bottom or last row of the networks. Generally, if $n=2^m$, the Summing Networks will consist of m rows of adders with $2^{m-1}$ adders in the first row, $2^{m-2}$ adders in the second row, ..., 1 adder in the m-th row which contains two variable inputs from the m−1th row as well as the fixed summand 1 in the case of network 52.

Figure 13:
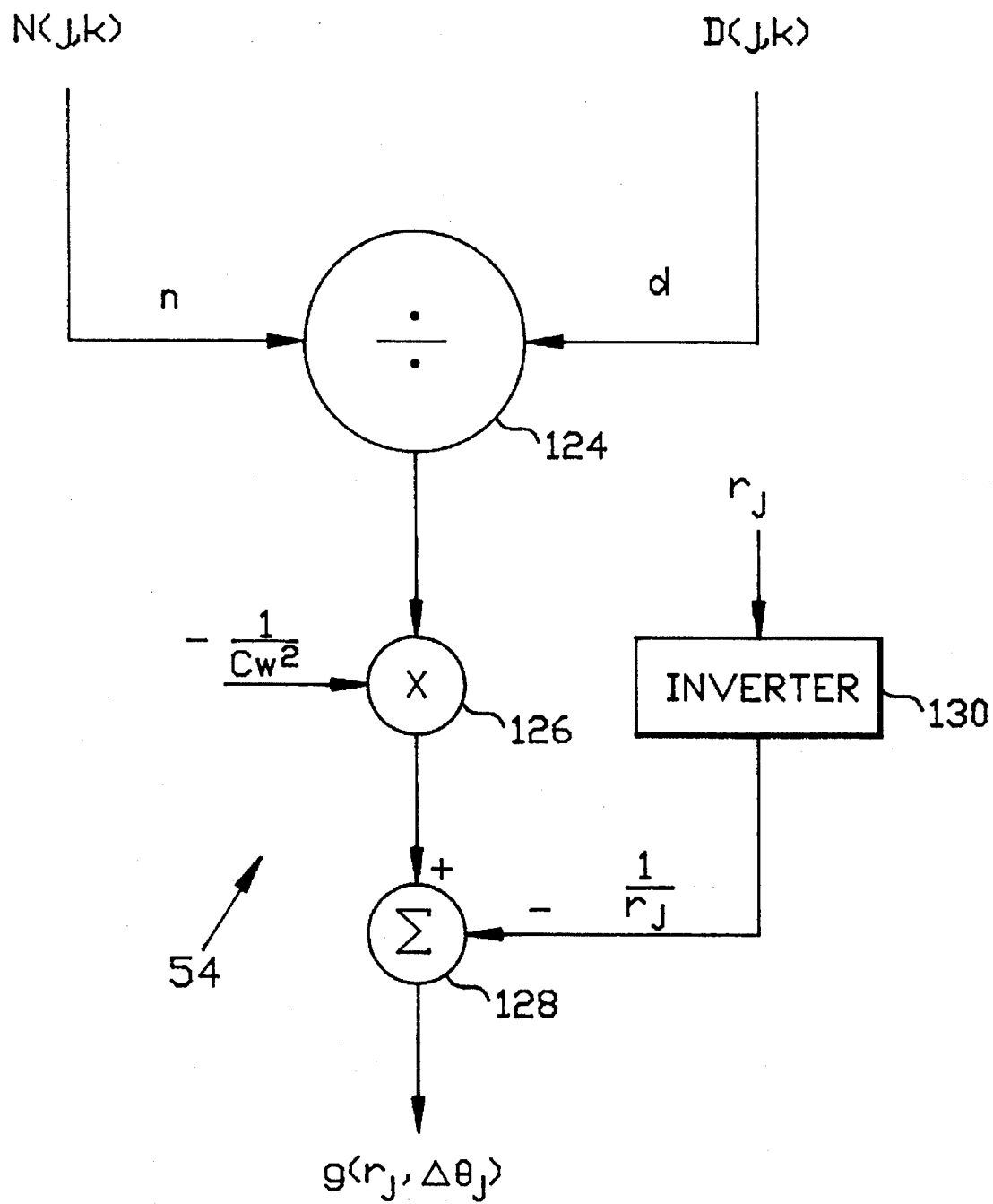
FIG. 13 shows a block diagram of a first gain factor calculator as may be used in the invention.

Gain Factor Calculator I (54):

Gain Factor Calculator I (54) shown in FIG. 2 is shown in detail in FIG. 13. In Gain Factor Calculator I (54), $N(j,k)$ from Summing Network I (48) and $D(j,k)$ from Summing Network III (52) are ratioed in divider 124. This serves as one factor of Gain Factor (g). This term is multiplied by $-1/Cw^2$ in multiplier 126 and added in adder 128 to the second term of Gain Factor (g), $-1/r_j$, from invertor 130 producing Gain Factor Calculator I output $g(r_j,\Delta\Theta_j)$.

Figure 14:
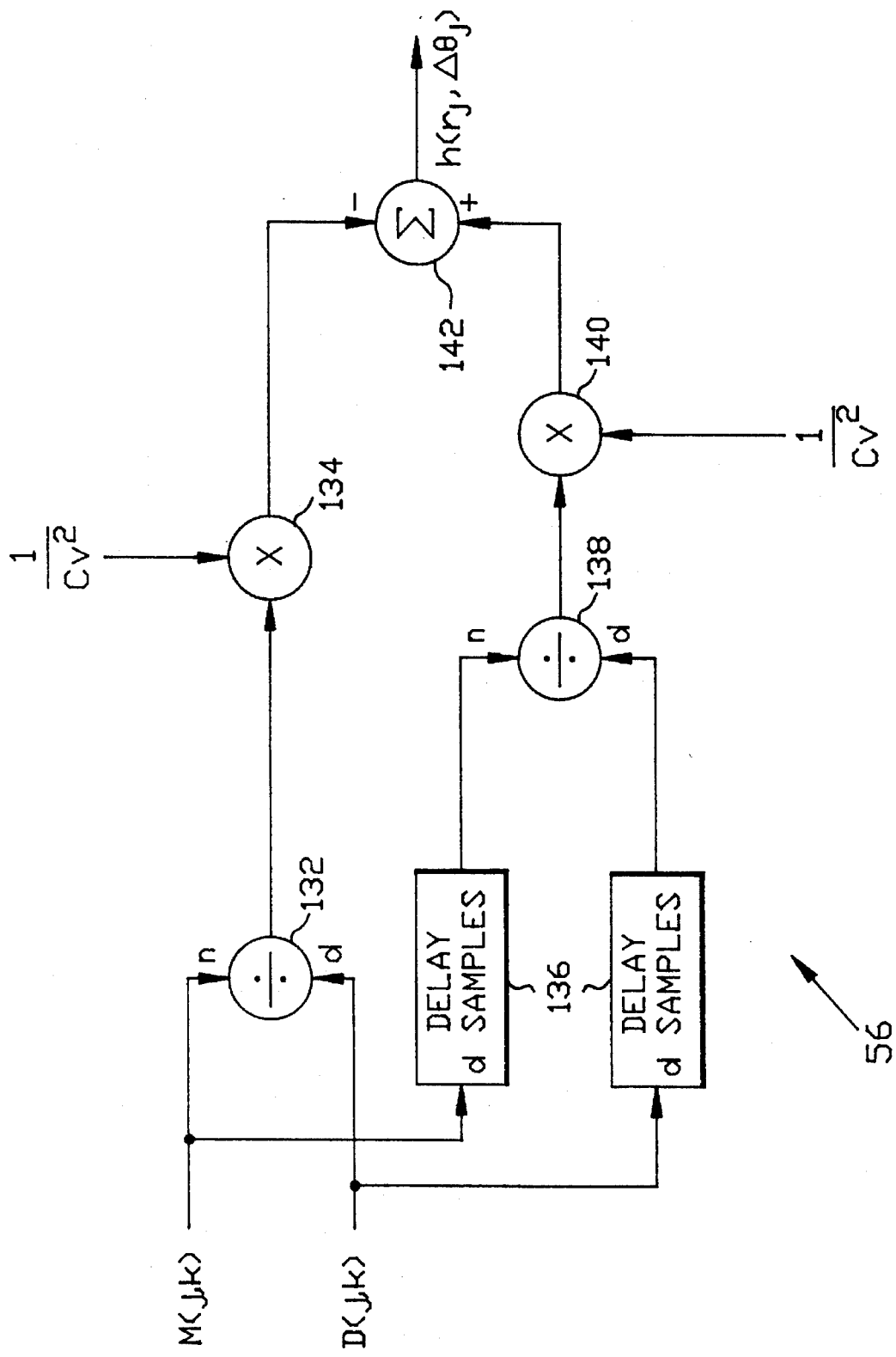
FIG. 14 is a block diagram illustration of a second gain factor calculator as may be used in the invention.

Gain Factor Calculator II (56):

Gain Factor Calculator II (56) shown in FIG. 2 is shown in detail in FIG. 14. The ratio of the outputs of Summing Networks II (56) and III (52), M(j,k) and D(j,k), respectively, provide one term of the gain factor calculated within Gain Factor Calculator II (56). The quotient of these is output from divider 132 to be multiplied by $1/Cv^2$ in multiplier 134. Summing Network outputs M(j,k) and D(j,k) are delayed in delays 136 by d samples and are ratioed in divider 138 to be multiplied by $1/Cv^2$ in multiplier 140. The delayed product from multiplier 140 is subtracted from the product of multiplier 134 in summer 142 to produce Gain Factor Calculator II (56) output $h(r_j,\Delta\Theta_j)$.

Figure 15:
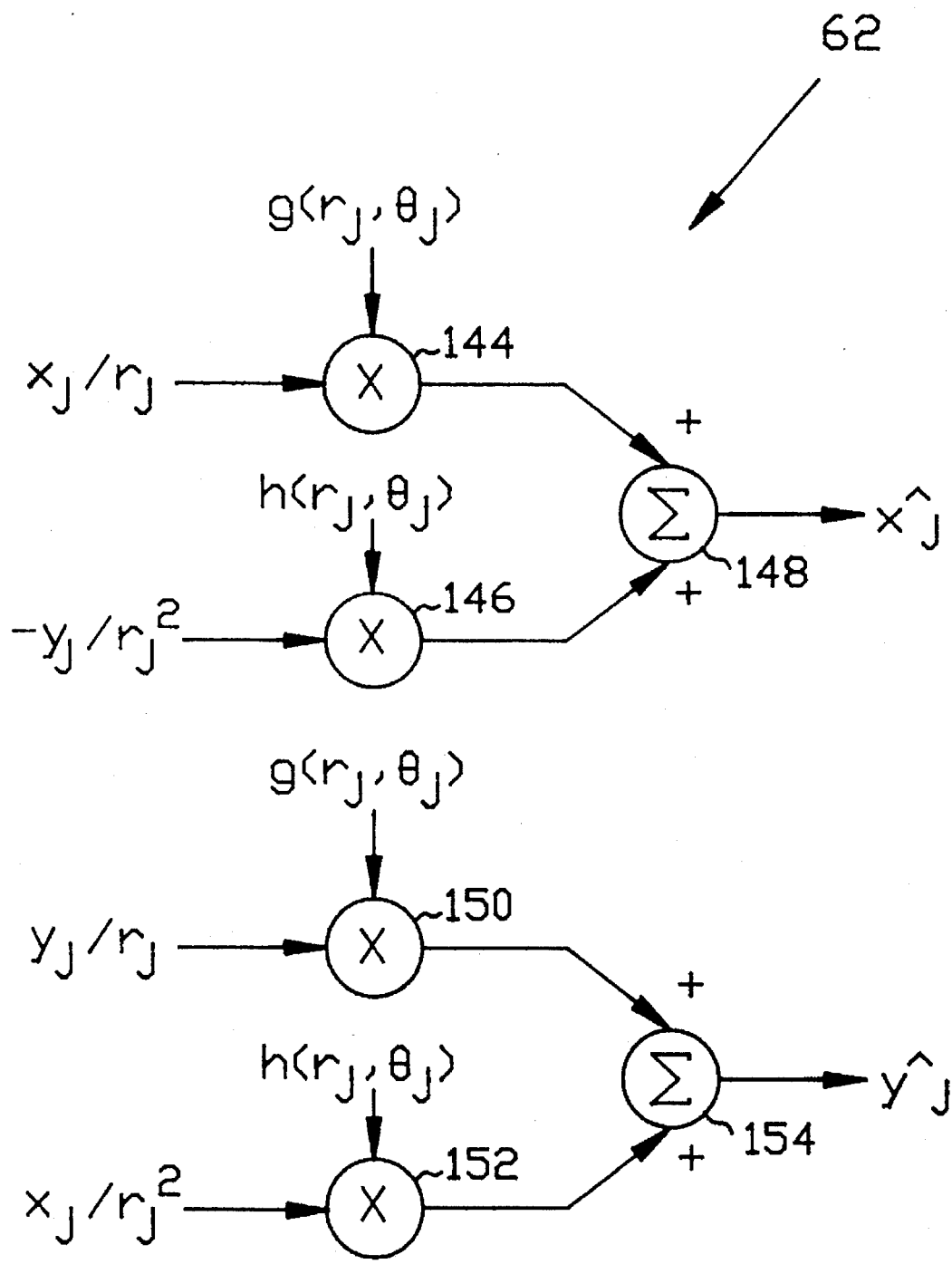
FIG. 15 illustrates a gain factor applier usable in the invention.

Gain Factor Applier (62):

Gain Factor applier (62) shown in FIG. 2 is shown in greater detail in FIG. 15. Processing of the receive signal samples is completed in gain factor applier 62. The gain factors of the invention are used to form interference suppressed transformed signal samples. In FIG. 15 it can be seen that the transformed signal samples $\hat{x}_j$ is formed by multiplying gain factor $g(r_j,\Theta_j)$ times component $x_j/r_j$ from coordinate normalizer 58 of FIG. 2 in a multiplier 144 and by multiplying gain factor $h(r_j,\Theta_j)$ times $-y_j/r_j^2$ from coordinate rotator 60 of FIG. 2 in multiplier 62. In adder 148 these products are summed to produce transformed signal sample component $\hat{x}_j$.

In a similar fashion, gain factor $g(r_j,\Theta_j)$ is multiplied in multiplier 150 by component $y_j/r_j$ from normalizer 58. As can also be seen, gain factor $h(r_j,\Theta_j)$ is multiplied in multiplier 152 by component $x_j/r_{j2}$ from coordinate rotator 60. The products of multipliers 150 and 152 are summed in adder 154 to produce transformed signal sample component $\hat{y}_j$.

The principle of operation of the invention will now be briefly summarized. This operation is based upon the technique of Kernel estimation applied to a joint probability density function (PDF) of receive signal magnitudes, in this case signal amplitudes, and received signal phase-differences. Kernel estimation is a general technique of probability density function estimation and is applicable to a joint PDF as described in the Silverman reference indicated above.

The Two-Dimensional Kernel ALOD Processor of the invention is structured to make use of an un-normalized Gaussian Kernel of two variables:

$$K(x,x_i,y,y_i)=e^{-(1/2)[((x-x_i)^2/w^2)+((y-y_i)^2/v^2)]}$$

with $w>0$ and $v>0$.

The parameters w and v are windows of the variables x and y of the kernel. The function $K(x,x_i,y,y_i)$ is a constant times a two dimensional Gaussian distribution centered about the sample $(x_i,y_i)$ with standard deviations w of variable x and v of variable y.

For a sufficient number of samples $(x_i,y_i)$ and appropriate choices of w and v, the theory of PDF estimation suggests that the summation $$1/N \sum_i [K(x, x_i, y, y_i)]$$

where N is the number of samples used is an excellent approximation of the joint PDF of x and y up to a constant. This approximation depends only on v and w and the nature of the selected kernel function. In addition, this estimation gives a function which is everywhere differentiable.

The ability of the kernel estimation to resolve details in the actual PDF depends on the choice of the window parameters w and v.

Two-dimensional ALOD algorithms require the calculation of: $(d/dx)[\ln\{p(x,y)\}/x]$ and $(d/dy)[\ln\{p(x,y)\}/x]$, where $(d/dx)$ and $(d/dy)$ stand for the partial derivatives with respect to x and y. These partial derivatives are readily evaluated when $p(x,y)$ is estimated by a sum of two-dimensional Gaussian kernels. In particular, $$(d/dx)\left[\ln\left\{\sum_i [K(x, x_i, y, y_i)]\right\}\right] =$$

$$\sum_i [(d/dx)K(x, x_i, y, y_i)]/\sum_i [K(x, x_i, y, y_i)] =$$

$$-\sum_i [((x-x_i)/w^2)K(x, x_i, y, y_i)]/\sum_i [K(x, x_i, y, y_i)]$$

where the last equality follows from $$(d/dx)K(x,x_i,y,y_i)=-((x-x_i)/w^2)K(x,x_i,y,y_i).$$

Since the function is symmetric in x and y, if w and v are interchanged, $$(d/dy)K(x,x_i,y,y_i)=-((y-y_i)/v^2)K(x,x_i,y,y_i).$$

Figure 16A:
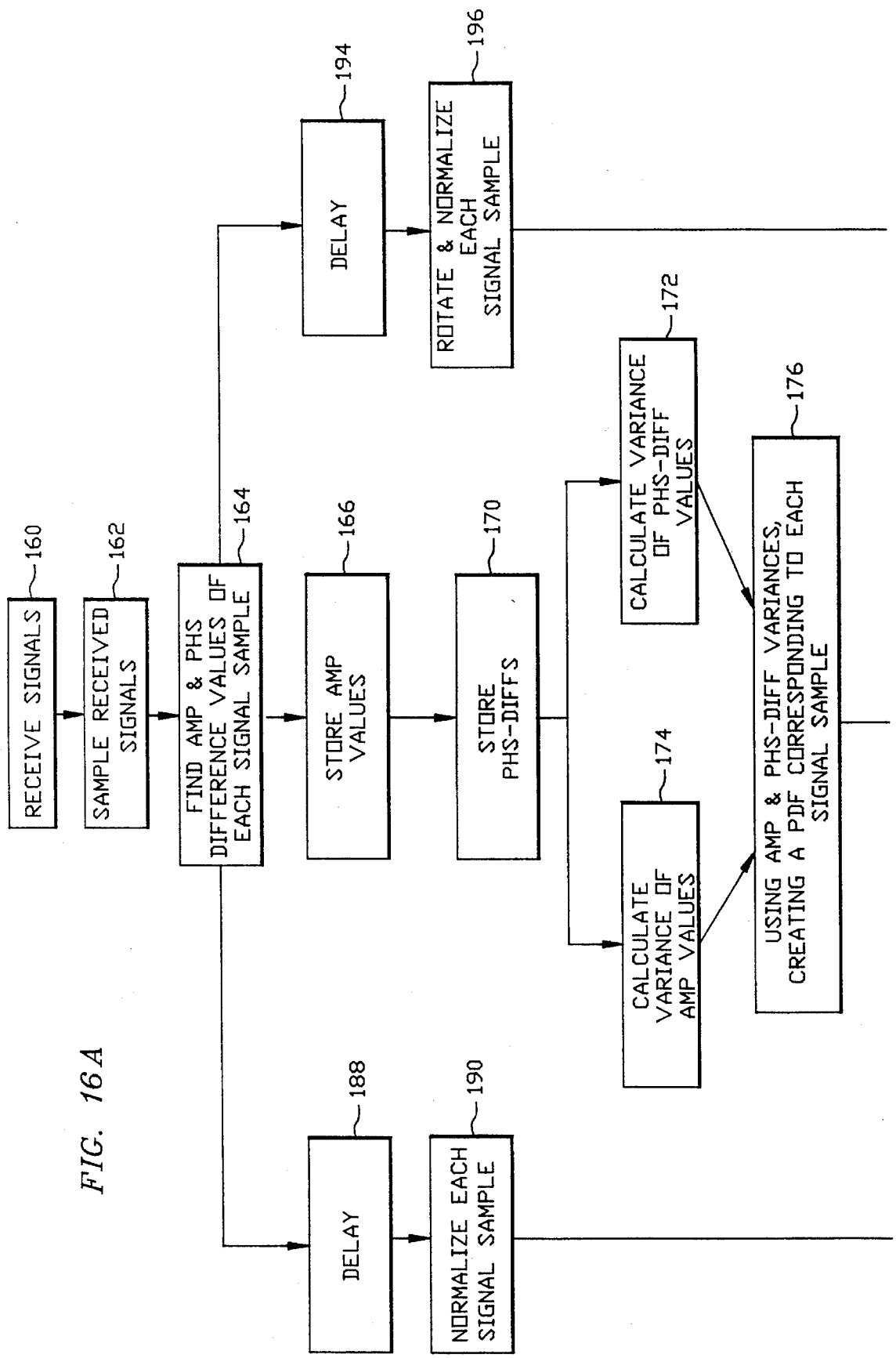
FIGS. 16A and 16B are a flow chart describing various processing steps such as those that may take place in a representative embodiment of the invention.
Figure 16B:
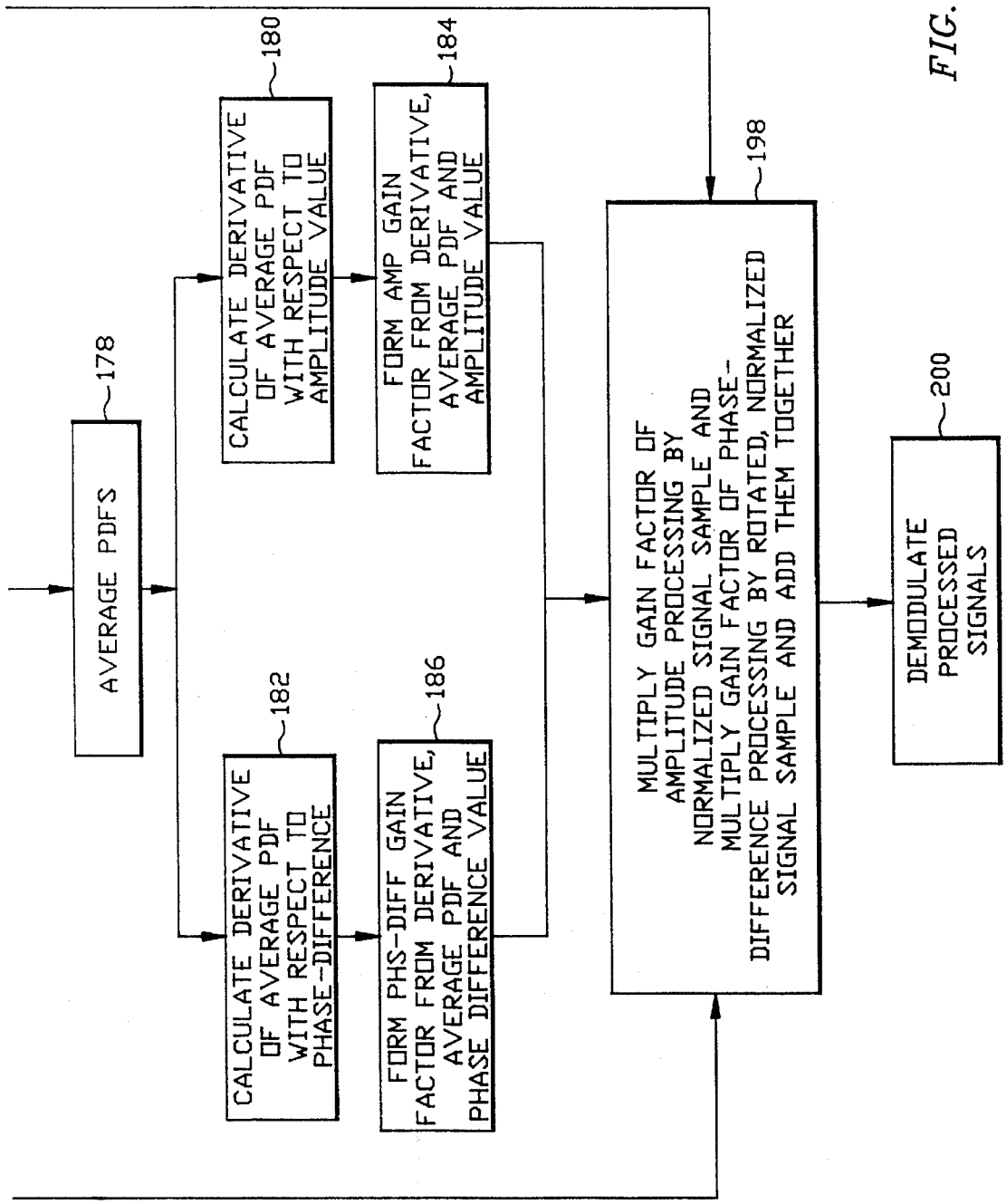

In FIG. 16 a flow chart is presented to illustrate the process of the invention. Referring to this figure in conjunction with FIGS. 1 and 2, the process of the invention begins by receiving signals in step 160. These signals, such as radio frequency signals, are received by radio receiver 12 of FIG. 1. The receive signals are then sampled in step 162 within receiver 12. The process of the invention is then used to calculate the amplitude values and phase-difference values of each signal sample, step 164. In the invention these amplitude and phase-difference values are calculated within coordinate transformer 42 shown in FIG. 2. Steps 166 and 170 include storing the amplitude and phase-difference values, respectively. The amplitude values are stored within Serial-to-parallel Converter I (34) with the phase-difference values being stored in Serial-to-parallel Converter II (36). A calculation of the variance of the phase-difference values, step 172, is made in Window Calculator II (40) shown in FIG. 2. At this stage the variance of the amplitude values is also calculated, shown as step 174, taking place within Window Calculator I (38) of FIG. 2. The amplitude and phase difference variances are then used to create a probability density function corresponding to each signal sample. This is shown as step 176 and takes place within Summing Network III (52). Also taking place within Summing Network III (52) is an averaging of the PDFs, this shown as step 178 in FIG. 16. The average PDF is used two ways to (1) calculate the derivative of the average PDF with respect to amplitude value, step 180, and (2) to calculate the derivative of the average PDF with respect to phase-difference, step 182. Step 180 takes place within Summing Network I (48) shown in FIG. 2 with step 182 taking place within Summing Network II (50) of FIG. 2. The gain factors used in transforming the receive signal samples are then formed.

In step 184 the amplitude gain factor is formed from the derivative calculated in step 180, the average PDF and the amplitude value of the jth sample. Similarly, in step 186, the phase-difference gain factor is formed from the derivative calculated in step 182, the average PDF and the phase-difference value of the $\Delta\Theta_j$th sample.

As can be seen in FIG. 16 the processor of the invention also normalizes the amplitude and phase-difference values of each signal sample, step 190. The normalization occurs in coordinate normalizer 58 shown in FIG. 2. A delay, step 188, first delays the normalization step sufficiently to permit processing of all samples through processor 16. Delay 188 corresponds to "n" delays 192 shown in FIG. 2. Also shown is a coordinate rotation and normalization step 196 taking place in coordinate rotator and normalizer 60 of FIG. 2. The rotated and normalized amplitude and phase-difference signal samples are delayed in delay 194 by delays 192 used for delay step 188. In step 198 the gain factor of the amplitude processing is multiplied times each normalized signal sample and the gain factor of the phase-difference processing is multiplied by each rotated normalized signal sample, and these are added together. Step 198 takes place in gain factor applier (62) shown in FIG. 2. Step 198 produces interference compensated transformed signal samples that are passed to a demodulating step 200 taking place in demodulator 14 shown in FIG. 1.

An alternative embodiment of the invention will now be described with the aid of FIGS. 17–21. This alternative is an asymmetric design of the two-dimensional Kernel ALOD Processor previously described. As the Kernel function $(x_j, x_k)$ is a symmetric function, for any two variables x and y, $K(x,y)=K(y,x)$. This property of the kernel function makes possible an asymmetric design of the two-dimensional Kernel ALOD Processor in which fewer calculations are necessary.

Figure 17:
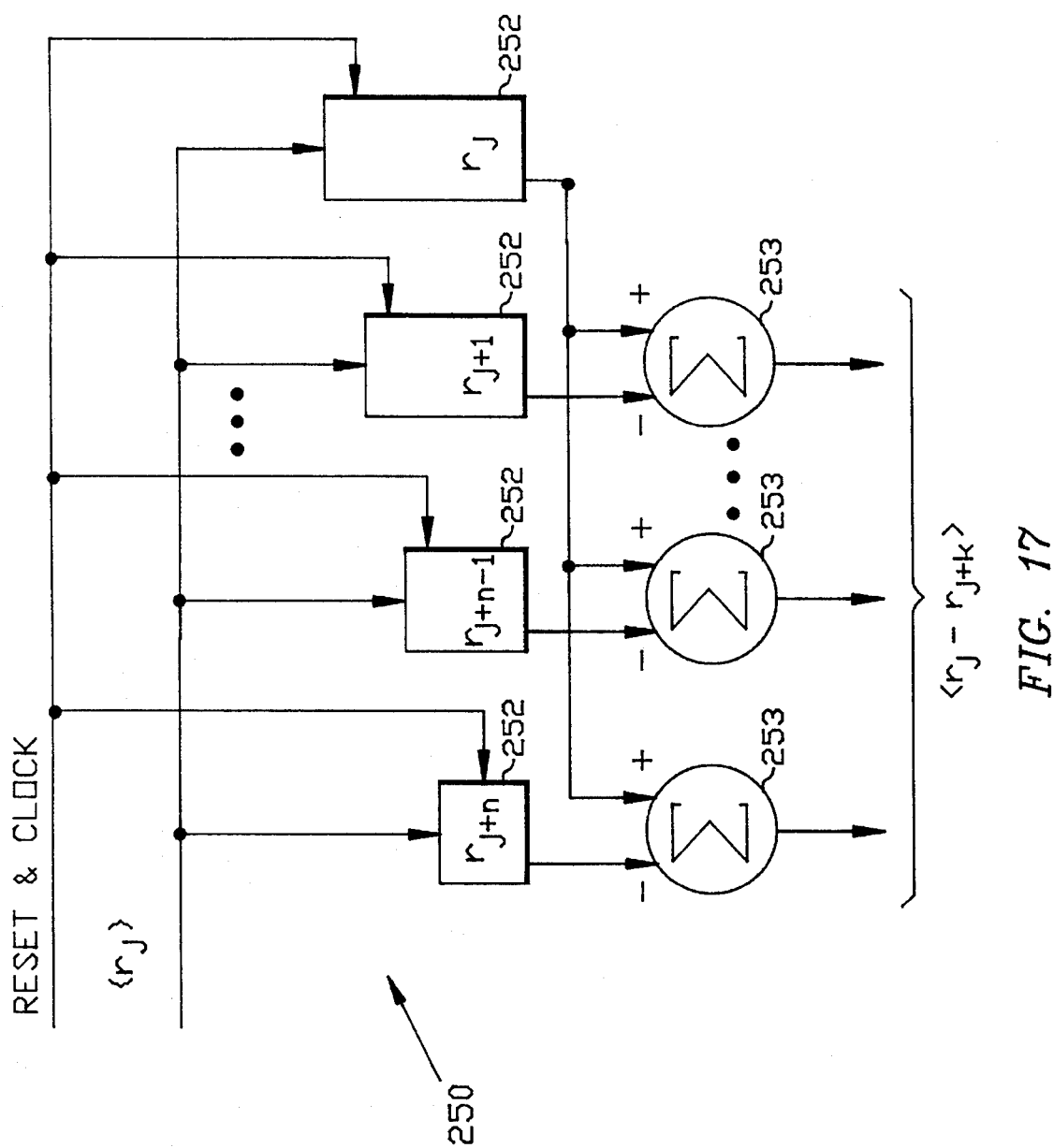
FIGS. 17 and 18 illustrate serial-to-parallel converters that may be utilized in an alternative embodiment of the invention.

To evaluate the transform of the next sample, j+1, the Kernel $K(x_{j+1}, x_{j+1-1})$ is needed, which is nearly the same as $K(x_j, x_{j+1})$ because it has the form $e^{-(1/2)(x_j - x_{j+1})^2/Cw^2}$. Likewise, $K(x_j, x_{j+2})$ calculated for sample j provides the term $K(x_{j+2}, x_{j+2-2})$ needed two samples later to calculate the transform for index j+2. If past Kernel evaluations could be saved, then at any sample time only half as many Kernel evaluations would be needed to estimate a transform for a given sample time. To take advantage of Kernel symmetry, the following hardware changes need to be made to the processor of the invention:

In FIG. 17 there is shown the structure of an Asymmetric Kernel ALOD Processor Serial-to-parallel Converter I (250) that should be substituted for Serial-to-parallel Converter I (34) of FIG. 2. Serial-to-parallel Converter I (250) consists of n+1 (rather than 2n+1) shift registers 252 of lengths 1 to n (rather than 1 to 2n). The output of the longest shift register is subtracted in summers 253 from the other shift register outputs (rather than the center shift register outputs from the other shift register output as described previously). Thus, the input of Serial-to-parallel Converter I (250) is the sequence of magnitudes $\{r_j\}$ and its output is the length n vector $<r_{j+k}-r_j>, k=1, \ldots n$. This output vector makes up the "top half" of the output vector of the previously described invention.

Figure 18:
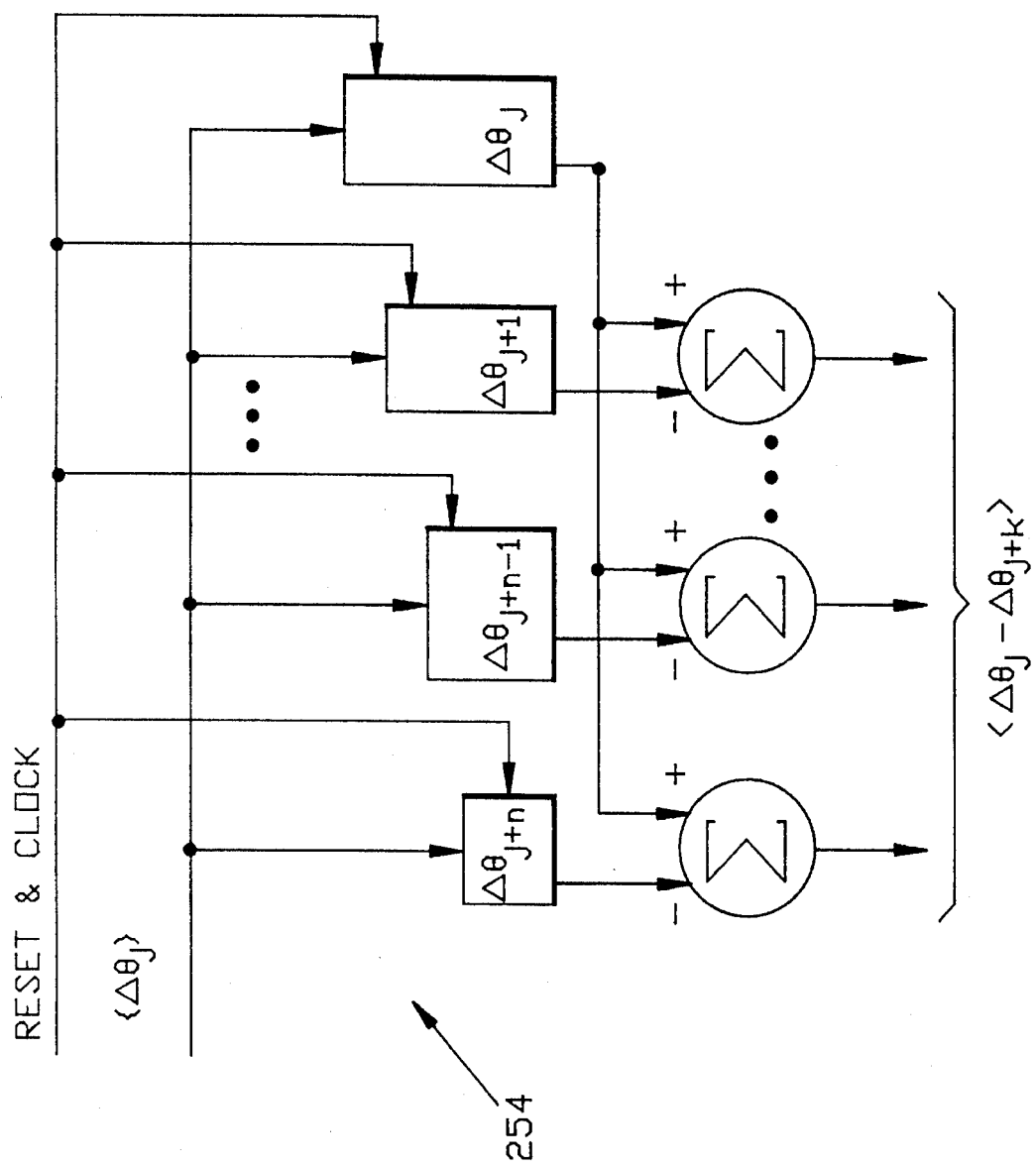

As this asymmetric design is processing two dimensions of receive signals, magnitude and phase-difference, FIG. 18 illustrates Serial-to-parallel Converter II (254) that may be used with the phase-dimension of the processing and that should be substituted for Serial-to-parallel Converter II (36) of FIG. 2. As can be seen, Serial-to-parallel Converter II (254) is identical to Serial-to-parallel Converter I (250) of FIG. 17 except that processor 254 has as its input the sequence of phase-differences $\{\Delta\Theta_j\}$ with its output being the length n vector $<\Delta_{j+k}-\Delta\Theta_j>, K=1, \ldots n$.

Figure 19:
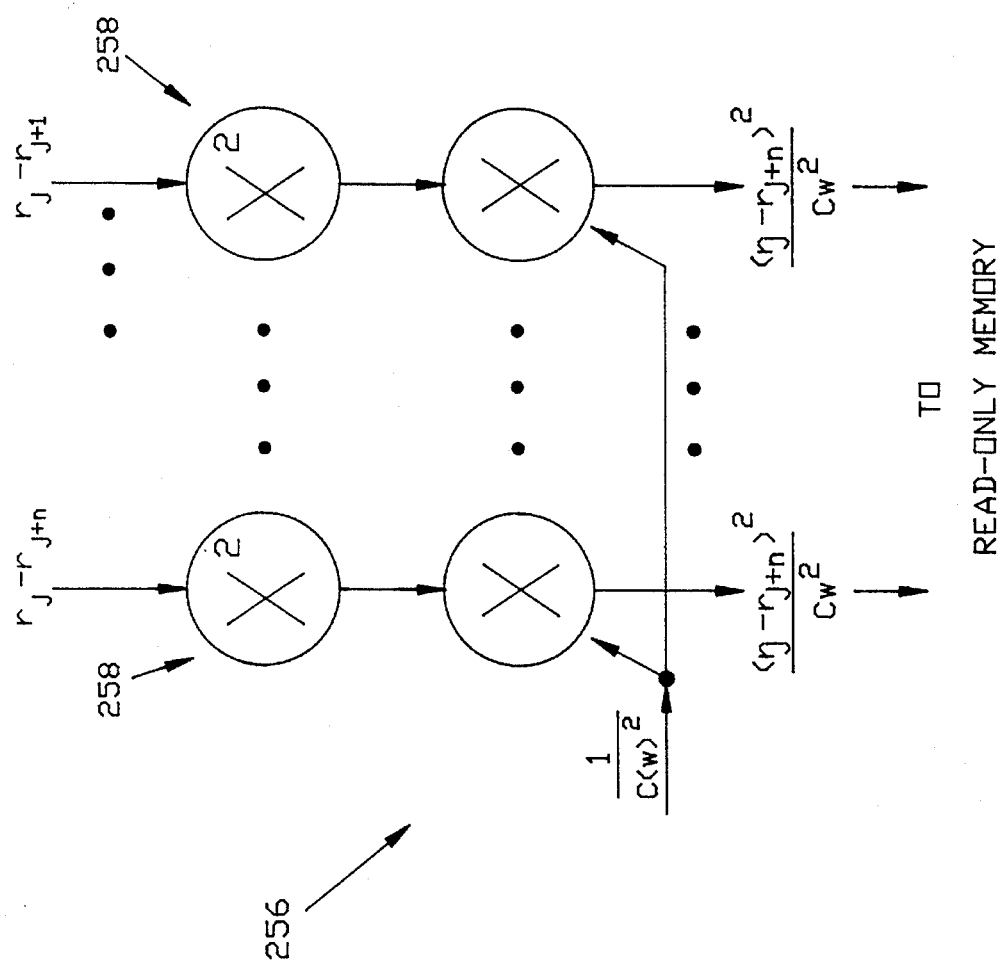
FIGS. 19 and 20 show weight input calculators as may be used with an alternate form of the invention.
Figure 20:
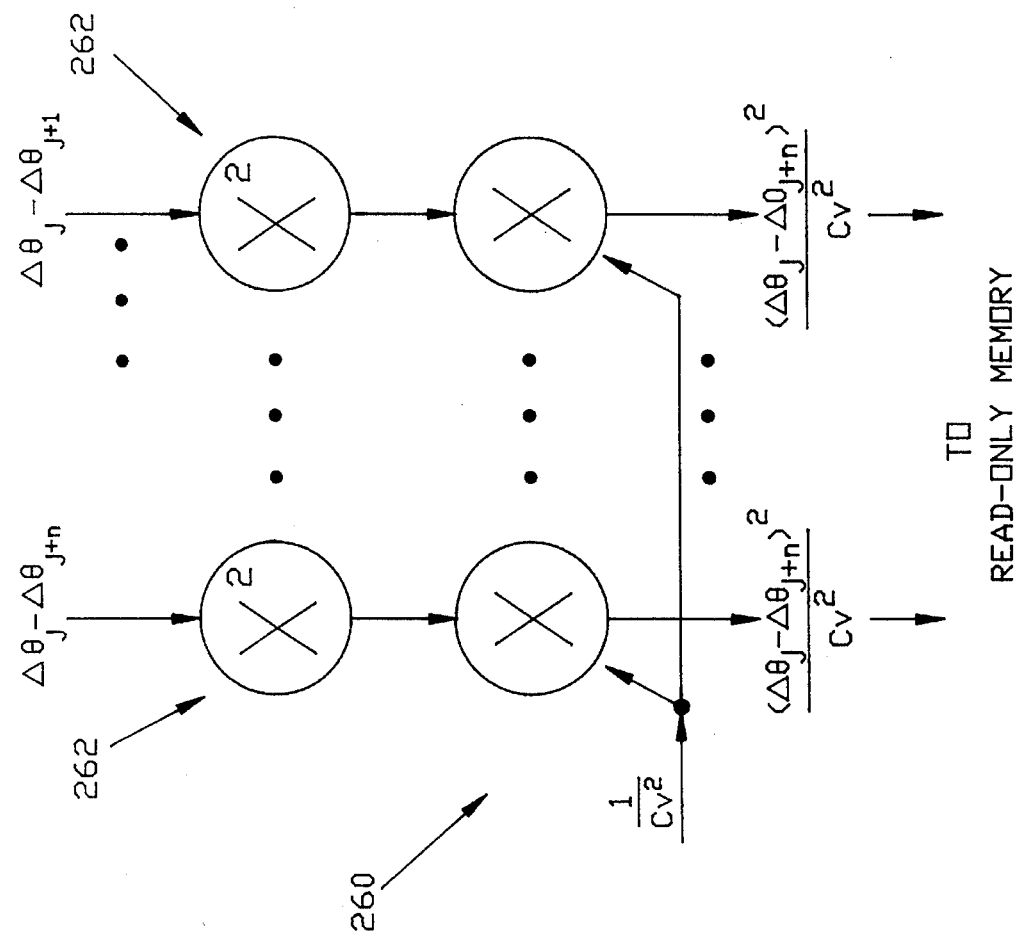

Referring to FIGS. 19 and 20, Weight Input Calculators for the asymmetric embodiment of the invention are shown. The output of Serial-to-parallel Converter I (250) shown in FIG. 17 goes to Weight Input Calculator I (256) of FIG. 19. Weight Input Calculator I (256) should be used in place of Weight Input Calculator I (44) of FIG. 2.

Weight Input Calculator I (256) includes n parallel normalizing paths 258 rather than the 2n parallel normalizing paths shown in Weight Input Calculators I and II of FIGS. 8 and 9. Weight Input Calculator I (256) outputs $<(r_{j+k}-r_j)^2/Cw^2>$, with w calculated as it was previously with this output being an n vector with $k=1, \ldots n$.

In FIG. 20, Weight Input Calculator II (260) is shown. Weight Input Calculator II (260) is designed to take the place of Weight Input Calculator II (46) of FIGS. 2 and 9. Weight Input Calculator 260 is identical to Weight Input Calculator 256 except that the phase-difference dimension of the receive signals is processed. As can be seen, Weight Input Calculator 260 includes n parallel normalizing paths 262 rather than the 2n normalizing paths shown for Weight Input Calculator II (46) of FIG. 9. Weight Input Calculator 260 outputs $<(\Delta\Theta_{j+k}-\Delta\Theta_j)^2/Cv^2>$, with v calculated as it was previously. This output is an n vector with $k=1, \ldots n$.

Each of the components of the output of Weight Input Calculator I (256) and Weight Input Calculator II (260) address Read-only Memory 32 of FIG. 2, which outputs in succession the components of:

$$<e^{-x_k/2}> \text{ where } x_k=(r_{j+k}-r_j)^2/Cw^2), k=1, \ldots n.$$

Figure 21:
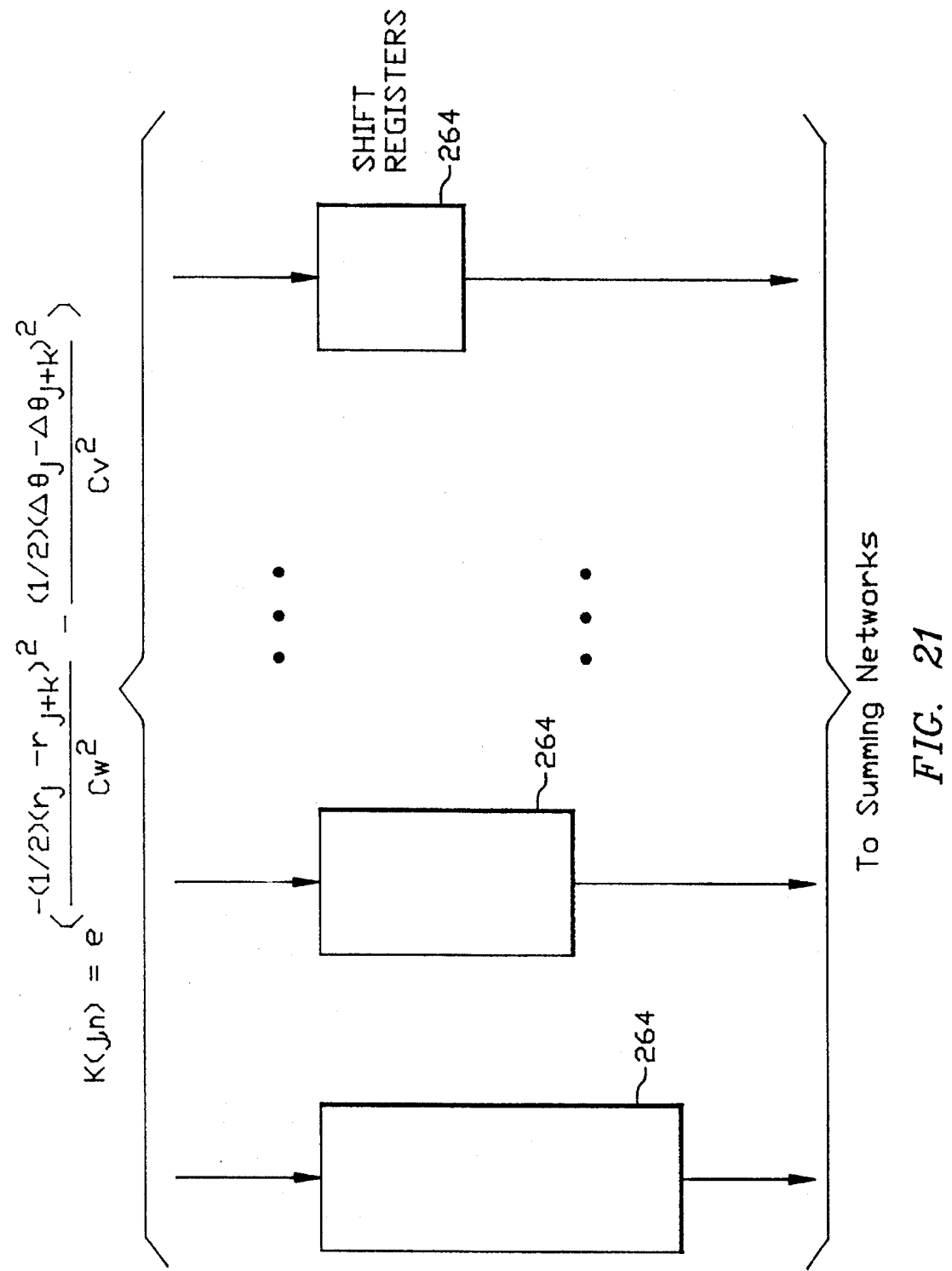
FIG. 21 shows a kernel retrieval network as may be utilized with an alternative form of the invention.

Referring to FIG. 21, another n shift registers 258 must be added to the output of Read-only Memory 32 to store the components of $<e^{-x}>$ which includes half the Kernel terms used by the previous transforms so that these Kernel values can be used to provide the remaining terms needed for future transforms.

In this addition to Read-only Memory 32, the component $$<e\left(\frac{-(1/2)(r_j-r_{j+k})^2}{Cw^2} - \frac{(1/2)(\Delta\theta_j-\Delta\theta_{j+k})^2}{Cv^2}\right)>$$

is the input to shift registers 264 of lengths k, $k=1,2, \ldots n$. The outputs of shift registers 264 provide the components of the vector $<e^{-x_k/2}>, k=-1, -2, \ldots -n$.

The outputs of shift registers 264 provide the inputs to Summing Network II (50) and Summing Network II (52) of FIG. 2. These summing networks are the same as previously described and all remaining components of the invention are the same as before.

In another alternative form of the invention, the term $\Delta\Theta_j=\Theta_j-\Theta_{j-d}$ can be replaced by a symmetric difference: $\Delta\Theta_j=2\Theta_j-\Theta_{j-d}-\Theta_{j+d}$. Additionally, in another alternative embodiment of the invention, $\Delta\Theta_j=\Theta_j-\Theta_{j-d}$ can be replaced by a scaled symmetric difference: $r_j\Delta\Theta_j=r_j(2\Theta_j-\Theta_{j-d}-\Theta_{j+d})$.

The invention previously described represents the probability function evaluated at $r_j$ by a sum of Kernels $K(r_j, r_k)$ with the index k running from j−n to j+n. As an alternative, this probability density function can be represented by summing over the index k running from j−m to j+m' with m and m' being different integers.

In particular, if only previous samples are used, m could be taken as a power of 2 and m' as 0. This choice would decrease the delay associated with the processor at the cost of estimating the probability density function in a way which uses only the samples prior in time to the sample j. To implement this alternative embodiment, Serial-to-parallel Converter I (34) and Serial-to-parallel Converter II (36) and the delays used in the process of the invention should be adjusted for the unequal choices of m and m'. Adders are used below all the shift registers shown in FIGS. 6 and 7 except the ones with $r_j$ and $\Delta\Theta_j$. The output of the shift register line with $r_j$ is routed to all its corresponding adders with the output of shift register line with $\Delta\Theta_j$ being routed to all its corresponding adders.

Obviously, many modifications and variations of the invention are possible in light of the above teachings. It is therefore to be understood that within the scope of the appended claims the invention may be practiced otherwise than has been specifically described.

What is claimed is:

1. A method comprising the steps of:
   receiving signals;
   taking samples of said signals;
   finding an amplitude value corresponding to each signal sample;
   finding a phase-difference value corresponding to each signal sample, said phase-difference value being the difference between the phase of each signal sample and the phase of a previous signal sample;
   storing said amplitude values and said phase-difference values;
   calculating the variance of said stored amplitude values;
   calculating the variance of said stored phase-difference values;
   obtaining an approximation of a probability density function corresponding to each signal sample using said variance of said stored amplitude values and said variance of said stored phase-difference values;
   averaging the probability density functions calculated;
   finding the derivative of the average of the probability density functions with respect to amplitude value;
   finding the derivative of the average of the probability density functions with respect to phase-difference;
   forming an amplitude gain factor from said derivative of the average of the probability density functions with respect to amplitude value, said average of the probability density functions and one of said amplitude values;
   forming a phase-difference gain factor from said derivative of the average of the probability density functions with respect to phase-difference, said average of the probability density functions and one of said phase-difference values;
   normalizing each radio frequency signal sample taken;
   rotating and normalizing each radio frequency signal sample taken;
   multiplying said amplitude gain factor times each normalized signal sample to obtain amplitude gain factor adjusted signal samples;
   multiplying said phase-difference gain factor times each rotated and normalized signal sample to obtain phase-difference gain factor adjusted signal samples;
   adding each amplitude gain factor adjusted signal sample to its corresponding gain factor adjusted signal sample to obtain summed gain factor adjusted signal samples; and
   inserting said summed gain factor adjusted signal samples into a demodulator.

2. The method of claim 1 in which said step of obtaining said probability density functions is done by calculating approximate kernels.

3. The method of claim 1 in which said step of obtaining said probability density functions is done by addressing a memory table.

4. The method of claim 1 in which said signals are radio frequency signals.

5. The method of claim 1 in which said samples are baseband samples.

6. A method for interference suppression comprising the steps of:
   receiving radio frequency signals;
   taking baseband samples of said radio frequency signals;
   finding an amplitude value corresponding to each baseband signal sample;
   finding a phase-difference value corresponding to each baseband signal sample, said phase-difference value being the difference between the phase of each baseband signal sample and the phase of a previous baseband signal sample;
   storing said amplitude values and said phase-difference values;
   calculating the variance of said stored amplitude values;
   calculating the variance of said stored phase-difference values;
   obtaining approximations of probability density functions for each baseband signal sample using said variance of said stored amplitude values and said variance of said stored phase-difference values;
   averaging the probability density functions calculated;
   finding the derivative of the average of the probability density functions with respect to amplitude value;
   finding the derivative of the average of the probability density functions with respect to phase-difference;
   forming an amplitude gain factor from said derivative of the average of the probability density functions with respect to amplitude value, said average of the probability density functions and one of said amplitude values;
   forming a phase-difference gain factor from said derivative of the average of the probability density functions with respect to phase-difference, said average of the probability density functions and one of said phase-difference values;
   normalizing each radio frequency baseband signal sample taken;
   rotating and normalizing each radio frequency baseband signal sample taken;
   multiplying said amplitude gain factor times each normalized baseband signal sample to obtain amplitude gain factor adjusted signal samples;
   multiplying said phase-difference gain factor times each rotated and normalized baseband signal sample to obtain phase-difference gain factor adjusted signal samples;
   adding each amplitude gain factor adjusted signal sample to its corresponding gain factor adjusted signal sample to obtain summed gain factor adjusted signal samples; and
   inserting said summed gain factor adjusted signal samples into a radio demodulator to output interference adjusted signals.

7. The method of claim 6 in which said step of obtaining said probability density functions is done by calculating approximate kernels.

8. The method of claim 6 in which said step of obtaining said probability density functions is done by addressing a memory table.

* * * * *